United States Patent
Izumoto et al.

(10) Patent No.: US 9,234,470 B2
(45) Date of Patent: Jan. 12, 2016

(54) IDLING STOP DEVICE, POWER CONTROL METHOD, DETERIORATION NOTIFICATION METHOD AND BATTERY CHARGING METHOD

(75) Inventors: Ryoh Izumoto, Kobe (JP); Motoki Komiya, Kobe (JP); Yuuichiroh Shimizu, Kobe (JP); Yoshinori Shibachi, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 960 days.

(21) Appl. No.: 13/032,229

(22) Filed: Feb. 22, 2011

(65) Prior Publication Data

US 2011/0208410 A1 Aug. 25, 2011

(30) Foreign Application Priority Data

Feb. 24, 2010 (JP) .................................. 2010-039113
Feb. 24, 2010 (JP) .................................. 2010-039114
Feb. 24, 2010 (JP) .................................. 2010-039115

(51) Int. Cl.
*F02D 17/04* (2006.01)
*F02D 29/00* (2006.01)
(Continued)

(52) U.S. Cl.
CPC ............... *F02D 29/02* (2013.01); *B60W 10/06* (2013.01); *B60W 10/30* (2013.01); *B60W 30/192* (2013.01);
(Continued)

(58) Field of Classification Search
CPC ......... F02D 29/02; F02D 41/22; F02D 45/00; F02N 11/08; F02N 11/087; F02N 11/0855; Y02T 10/48

USPC ........ 701/112, 113; 123/179.3, 179.4, 198 D, 123/198 DB, 198 DC

See application file for complete search history.

(56) References Cited

U.S. PATENT DOCUMENTS 6,532,926 B1 * 3/2003 Kuroda et al. ............. 123/179.4
6,727,676 B2 * 4/2004 Ochiai ......................... 320/104
(Continued)

FOREIGN PATENT DOCUMENTS

JP   A-08-192723   7/1996
JP   A-09-240430   9/1997
(Continued)

OTHER PUBLICATIONS

JP 2009-255742 English Translation.*
(Continued)

*Primary Examiner* — John Kwon
*Assistant Examiner* — Johnny Hoang
(74) *Attorney, Agent, or Firm* — Oliff PLC

(57) ABSTRACT

An idling stop device is mounted on a vehicle. A microcomputer has an idling stop function of automatically stopping an engine of the vehicle when a predetermined stop condition is established and automatically starting the engine when a predetermined start condition is established during the stopping of the engine. A detecting unit detects that a power voltage of the microcomputer, which is obtained by dropping a voltage of a battery of the vehicle is lower than a minimal operation voltage of the microcomputer. A storage unit stores voltage decrease information irrespective of a state of the microcomputer if the power voltage is lower than the minimal operation voltage. A power control unit stops supply of power to some of electrical loads to which power is supplied from the battery when the engine is started, if the voltage decrease information is stored in the storage unit.

11 Claims, 16 Drawing Sheets

(51) Int. Cl.
*F02D 29/02* (2006.01)
*B60W 10/06* (2006.01)
*B60W 10/30* (2006.01)
*B60W 30/192* (2012.01)
*F02N 11/08* (2006.01)

(52) U.S. Cl.
CPC ............ *F02D 17/04* (2013.01); *F02N 11/0825* (2013.01); *B60W 2510/244* (2013.01); *F02N 11/084* (2013.01); *F02N 2250/02* (2013.01); *F02N 2300/30* (2013.01); *Y02T 10/48* (2013.01)

(56) References Cited

U.S. PATENT DOCUMENTS

| | | | |
|---|---|---|---|
| 7,548,805 B2 * | 6/2009 | Yamaguchi et al. | 701/36 |
| 7,860,637 B2 * | 12/2010 | Yamaguchi | 701/112 |
| 8,056,536 B2 * | 11/2011 | Nakauchi et al. | 123/406.57 |
| 8,244,449 B2 * | 8/2012 | Mizuno | 701/113 |
| 2002/0158513 A1 * | 10/2002 | Amano et al. | 307/10.6 |
| 2003/0183191 A1 * | 10/2003 | Bertness et al. | 123/198 R |
| 2005/0263121 A1 * | 12/2005 | Tamagawa et al. | 123/179.3 |
| 2007/0157910 A1 * | 7/2007 | Obayashi et al. | 123/559.1 |
| 2008/0215266 A1 * | 9/2008 | Mizuno et al. | 702/63 |
| 2009/0050092 A1 * | 2/2009 | Handa et al. | 123/179.3 |
| 2010/0312460 A1 * | 12/2010 | Yamaguchi | 701/112 |
| 2011/0004396 A1 * | 1/2011 | Yamaguchi | 701/113 |

FOREIGN PATENT DOCUMENTS

| | | |
|---|---|---|
| JP | A-2000-80940 | 3/2000 |
| JP | A-2000-204995 | 7/2000 |
| JP | A-2001-4724 | 1/2001 |
| JP | A-2002-054495 | 2/2002 |
| JP | A-2003-35176 | 2/2003 |
| JP | A-2003-244804 | 8/2003 |
| JP | A-2003-269213 | 9/2003 |
| JP | A-2004-353474 | 12/2004 |
| JP | A-2007-40229 | 2/2007 |
| JP | A-2007-046546 | 2/2007 |
| JP | A-2007-230513 | 9/2007 |
| JP | 2007-285241 A | 11/2007 |
| JP | A-2008-231965 | 10/2008 |
| JP | A-2009-12568 | 1/2009 |
| JP | A-2009-13953 | 1/2009 |
| JP | A-2009-52416 | 3/2009 |
| JP | A-2009-166549 | 7/2009 |
| JP | A-2009-241646 | 10/2009 |
| JP | 2009-255742 A | 11/2009 |
| JP | A-2010-64538 | 3/2010 |
| JP | A-2010-132052 | 6/2010 |

OTHER PUBLICATIONS

JP 2007-285241 English Translation.*

Oct. 8, 2013 Office Action issued in Japanese Patent Application No. 2010-039114 (with English translation).

Dec. 9, 2014 Office Action issued in Japanese Patent Application No. 2010-039114.

May 7, 2014 Office Action issued in Japanese Patent Application No. 2010-039114 (with partial English Translation).

* cited by examiner

IDLING STOP DEVICE, POWER CONTROL METHOD, DETERIORATION NOTIFICATION METHOD AND BATTERY CHARGING METHOD

The disclosure of Japanese Patent Applications No. 2010-039113, No. 2010-039114, and No. 2010-039115 filed on Feb. 24, 2010, including specifications, drawings and claims is incorporated herein by reference in its entirety.

BACKGROUND

The present invention relates to an idling stop technique which automatically stops/starts an engine of a vehicle.

In recent years, for the purpose of saved fuel and reduced exhaust gas, an idling stop device which automatically stops/starts an engine of a vehicle while it is stopping for a relatively short time such as in a red light have been in practical use. For the vehicle equipped with such an idling stop device, the engine is stopped when a stop condition such as stepping on the vehicle's brake to transition its traveling state into its stop state is established, whereas the engine is automatically started when a start condition such as releasing the brake during the engine stop is established (for example, see JP-A-2009-13953).

Power to drive a starter motor to start an engine of a vehicle is supplied from a battery mounted within the vehicle. Since power required by the starter motor to start the engine may be very high, when engine stopping/starting by an idling stop function is repeated as a battery voltage is decreased, the battery voltage may be further decreased to be so low that the engine cannot be started. Accordingly, in a case where the battery voltage is decreased due to deterioration of the battery, there is a need of a measure to prevent deterioration of the battery voltage in order to start the engine with the idling stop function.

Alternatively, in a case where the battery voltage is decreased due to deterioration of the battery, it is desirable to notify a user of information indicating deterioration of the battery to allow the user to replace the battery.

Further alternatively, in a case where the battery voltage is decreased due to deterioration of the battery, there is a need of a measure to increase the battery voltage.

As mentioned above, since power required by the starter motor to start the engine may be very high, the battery voltage may be greatly decreased when the engine is started. Accordingly, for example, a microcomputer mounted within the idling stop device is used to monitor the battery voltage when the engine is started by operation of a start switch by a user. At this time, if the battery voltage is decreased to be lower than a predetermined threshold value, it may be considered that the microcomputer executes a measure to prevent the battery voltage from being decreased when the engine is started with the idling stop function.

Alternatively, if the battery voltage is decreased to be lower than a predetermined threshold value, it may be considered to notify the user of the information indicating deterioration of the battery.

Further alternatively, if the battery voltage is decreased to be lower than a predetermined threshold value, it may be considered that the microcomputer executes a measure to increase the battery voltage.

However, since power to operate the microcomputer is also supplied from the battery, when an engine is started, if the battery voltage is significantly decreased to be lower than a voltage at which the microcomputer can operate, the microcomputer is reset without operating. The microcomputer reset in this manner and restarted cannot detect the cause of the reset and the battery voltage before being reset. The microcomputer may be reset even in situations other than decrease of the power voltage of the microcomputer, for example when the microcomputer falls into a runaway state; however, the microcomputer cannot detect the cause of such reset.

Therefore, even when the battery voltage is decreased such significantly that the microcomputer is reset, the reset microcomputer performs starting of the engine with the idling stop function without taking any measure to prevent the battery voltage from being decreased. As a result, the microcomputer is again reset, thereby disallowing the engine to be started.

In addition, even when the battery voltage is decreased such significantly that the microcomputer is reset, the reset microcomputer cannot recognize that the battery voltage is significantly decreased, and it is not possible to notify the user of the information indicating deterioration of the battery. As a result, the deteriorated battery is continuously used in the vehicle, thereby disallowing the engine to be started, eventually.

In addition, even when the battery voltage is decreased such significantly that the microcomputer is reset, the reset microcomputer repeats stopping/starting of the engine with the idling stop function without taking any measure to increase the battery voltage. As a result, the engine is disallowed to be started, eventually.

SUMMARY

It is therefore an object of at least one embodiment of the present invention to provide a technique which is capable of detecting decrease of a voltage of a battery even after a microcomputer is reset, and preventing the voltage of the battery from being significantly decreased when an engine is started.

It is another object of at least one embodiment of the present invention to provide a technique which is capable of detecting decrease of a voltage of a battery even after a microcomputer is reset, and notifying a user of information indicating deterioration of the battery.

It is still another object of at least one embodiment of the present invention to provide a technique which is capable of detecting decrease of a voltage of a battery even after a microcomputer is reset, and increasing the voltage of the battery.

In order to achieve at least one of the above-described objects, according to a first aspect of the embodiments of the present invention, there is provided an idling stop device which is mounted on a vehicle and automatically stops and starts an engine of the vehicle, the idling stop device comprising: a microcomputer having an idling stop function of automatically stopping the engine when a predetermined stop condition is established and automatically starting the engine when a predetermined start condition is established during the stopping of the engine; a detecting unit that detects that a power voltage of the microcomputer, which is obtained by dropping a voltage of a battery of the vehicle is lower than a minimal operation voltage of the microcomputer; a storage unit that stores voltage decrease information irrespective of a state of the microcomputer if the power voltage is lower than the minimal operation voltage; and a power control unit that stops supply of power to some of electrical loads to which power is supplied from the battery when the engine is started, if the voltage decrease information is stored in the storage unit.

With this configuration, if the power voltage of the microcomputer is lower than the minimal operation voltage of the microcomputer, the voltage decrease information is stored in the storage unit even when the microcomputer is reset.

Accordingly, the microcomputer after being reset can detect decrease of the voltage of the battery based on the voltage decrease information. Thereafter, by stopping the supply of power to some of the electrical loads when the engine is started, it is possible to prevent the voltage of the battery from being significantly decreased when the engine is started.

In the idling stop device, the power control unit may start the supply of power to the some of electrical loads, to which the supply of power has been stopped, after the engine is completely started.

With this configuration, by starting the supply of power to the electrical loads after the engine is completely started, it is possible to prevent the voltage of the battery from being significantly decreased due to a load imposed on the battery during the start of the engine.

In the idling stop device, the some of the electrical loads, to which the supply of power has been stopped, may be divided into a plurality of groups, and the power control unit may start the supply of power to the some of electrical loads for each of the groups with an interval.

With this configuration, by starting the supply of power to each group of electrical loads with an interval, it is possible to prevent the voltage of the battery from being significantly decreased due to a large load suddenly imposed on the battery.

According to a second aspect of the embodiments of the present invention, there is provided a power control method of controlling supply of power in a vehicle which is equipped with a microcomputer having an idling stop function of automatically stopping an engine of the vehicle when a predetermined stop condition is established and automatically starting the engine when a predetermined start condition is established during the stopping of the engine, the power control method comprising: detecting that a power voltage of the microcomputer, which is obtained by dropping a voltage of a battery of the vehicle is lower than a minimal operation voltage of the microcomputer; storing voltage decrease information irrespective of a state of the microcomputer if the power voltage is lower than the minimal operation voltage; and stopping supply of power to some of electrical loads to which power is supplied from the battery when the engine is started, if the voltage decrease information is stored in the storage unit.

According to a third aspect of the embodiments of the present invention, there is provided an idling stop device which is mounted on a vehicle and automatically stops and starts an engine of the vehicle, the idling stop device comprising: a microcomputer having an idling stop function of automatically stopping the engine when a predetermined stop condition is established and automatically starting the engine when a predetermined start condition is established during the stopping of the engine; a detecting unit that detects that a power voltage of the microcomputer, which is obtained by dropping a voltage of a battery of the vehicle is lower than a minimal operation voltage of the microcomputer; a storage unit that stores voltage decrease information irrespective of a state of the microcomputer if the power voltage is lower than the minimal operation voltage; and a notification unit that notifies a user of deterioration information indicating deterioration of the battery, if the voltage decrease information is stored in the storage unit.

With this configuration, if the power voltage of the microcomputer is lower than the minimal operation voltage of the microcomputer, the voltage decrease information is stored in the storage unit even when the microcomputer is reset. Accordingly, the microcomputer after being reset can detect a decrease in the voltage of the battery based on the voltage decrease information and notify the user of the information indicating the deterioration of the battery.

In the idling stop device, the notification unit may cause an indication unit provided in the vehicle to indicate the deterioration information.

With this configuration, a user within the vehicle can be quickly notified of the battery deterioration.

In the idling stop device, the notification unit may include a storage unit that stored the deterioration information, and a transmission unit that transmits the deterioration information stored in the storage unit to an external device in response to a signal from the external device.

With this configuration, a user who handles the external device can be notified of the battery deterioration.

According to a fourth aspect of the embodiments of the present invention, there is provided a deterioration notification method of notifying a user of deterioration of a battery in a vehicle which is equipped with a microcomputer having an idling stop function of automatically stopping an engine of the vehicle when a predetermined stop condition is established and automatically starting the engine when a predetermined start condition is established during the stopping of the engine, the deterioration notification method comprising: detecting that a power voltage of the microcomputer, which is obtained by dropping a voltage of a battery of the vehicle is lower than a minimal operation voltage of the microcomputer; storing voltage decrease information irrespective of a state of the microcomputer if the power voltage is lower than the minimal operation voltage; and notifying a user of deterioration information indicating deterioration of the battery, if the voltage decrease information is stored in the storage unit.

According to a fifth aspect of the embodiments of the present invention, there is provided an idling stop device which is mounted on a vehicle and automatically stops and starts an engine of the vehicle, the idling stop device comprising: a microcomputer having an idling stop function of automatically stopping the engine when a predetermined stop condition is established and automatically starting the engine when a predetermined start condition is established during the stopping of the engine; a detecting unit that detects that a power voltage of the microcomputer, which is obtained by dropping a voltage of a battery of the vehicle is lower than a minimal operation voltage of the microcomputer; a storage unit that stores voltage decrease information irrespective of a state of the microcomputer if the power voltage is lower than the minimal operation voltage; and an instruction unit that instructs an alternator of the vehicle to increase electric power to charge the battery, if the voltage decrease information is stored in the storage unit.

With this configuration, if the power voltage of the microcomputer is lower than the minimal operation voltage of the microcomputer, the voltage decrease information is stored in the storage unit even when the microcomputer is reset. Accordingly, the microcomputer after being reset can detect a decrease in the voltage of the battery based on the voltage decrease information and increase the voltage of the battery by increasing the electric power of the alternator to charge the battery.

In the idling stop device, the microcomputer may invalidate the idling stop function, if the voltage decrease information is stored in the storage unit.

With this configuration, by invalidating the idling stop function, the battery can be charged with the electric power of the alternator increased even in the idling state, thereby effectively increasing the voltage of the battery.

According to a fifth aspect of the embodiments of the present invention, there is provided a battery charging method of charging a battery in a vehicle which is equipped with a microcomputer having an idling stop function of automatically stopping an engine of the vehicle when a predetermined stop condition is established and automatically starting the engine when a predetermined start condition is established during the stopping of the engine, the battery charging method comprising: detecting that a power voltage of the microcomputer, which is obtained by dropping a voltage of a battery of the vehicle is lower than a minimal operation voltage of the microcomputer; storing voltage decrease information irrespective of a state of the microcomputer if the power voltage is lower than the minimal operation voltage; and instructing an alternator of the vehicle to increase electric power to charge the battery, if the voltage decrease information is stored in the storage unit.

DETAILED DESCRIPTION OF THE EMBODIMENTS

[First Embodiment]

Hereinafter, a first embodiment of the present invention will be described with reference to the drawings.

<Configuration>

Figure 1:
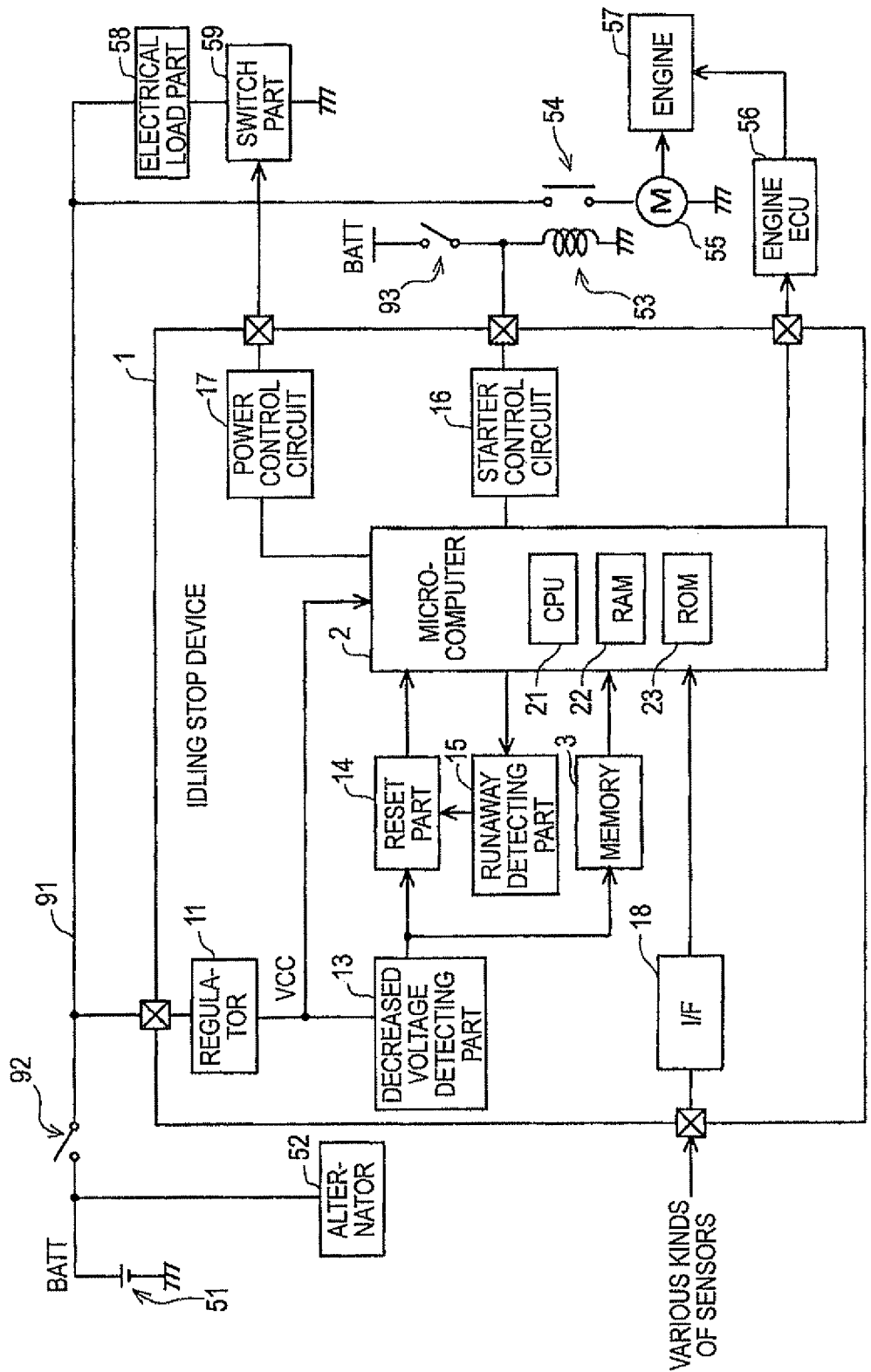
FIG. 1 is a block diagram showing a configuration of an idling stop device according to a first embodiment.

FIG. 1 is a block diagram showing a configuration of an idling stop device 1 and its peripheral components according to a first embodiment. The idling stop device 1 is mounted within, for example, a vehicle or the like and has the function of automatically stopping/starting an engine 57 mounted within the vehicle while it is stopping for a relatively short time such as at a red light.

The vehicle having the idling stop device 1 includes a battery 51 which supplies power to an electrical load of each of the components of the vehicle. A power line 91 is connected to the battery 51 and is provided with an ignition switch 92 operable by a user. When the ignition switch 92 is switched on, power is supplied from the battery 51 to the idling stop device 1 via the power line 91.

In addition, when the ignition switch 92 is switched on, power is also supplied from the battery 51 to an electrical load part 58 including various electrical loads mounted within the vehicle via the power line 91.

The battery 51 is charged by an alternator 52 which is a power generator. The alternator 52 converts mechanical kinetic energy transmitted from the engine 57 into AC power which is then rectified into DC power by means of a rectifier including diodes. The generated power is stored in the battery 51 via the power line 91. When the alternator 52 generates the power, a target voltage, which is a goal of the power generation, is set and the alternator 52 generates the power such that a voltage of the power line 91 reaches the target voltage.

The idling stop device 1 may be configured by an electronic control unit (ECU) and includes a microcomputer 2 as a main element. The microcomputer 2 includes a CPU 21, a RAM 22 and a ROM 23. Various functions of the microcomputer 2 may be implemented as the CPU 21 performs an arithmetic operation based on a program pre-stored in the ROM 23. Such functions of the microcomputer 2 may include a power control function and an idling stop function.

The power control function is a function of controlling supply/cut-off of power from the battery 51 to the electrical load part 58. A switch part 59 to switch an electrical connection state of the electrical loads included in the electrical load part 58 is provided at a ground side of the electrical load part 58. The operation of the switch part 59 is controlled by a power control circuit 17 in the idling stop device 1. When supply/cut-off of power to the electrical load part 58 is controlled with the power control function, the microcomputer 2 transmits a predetermined control signal to the power control circuit 17. The power control circuit 17 controls the operation of the switch part 59 in response to the control signal.

Figure 2:
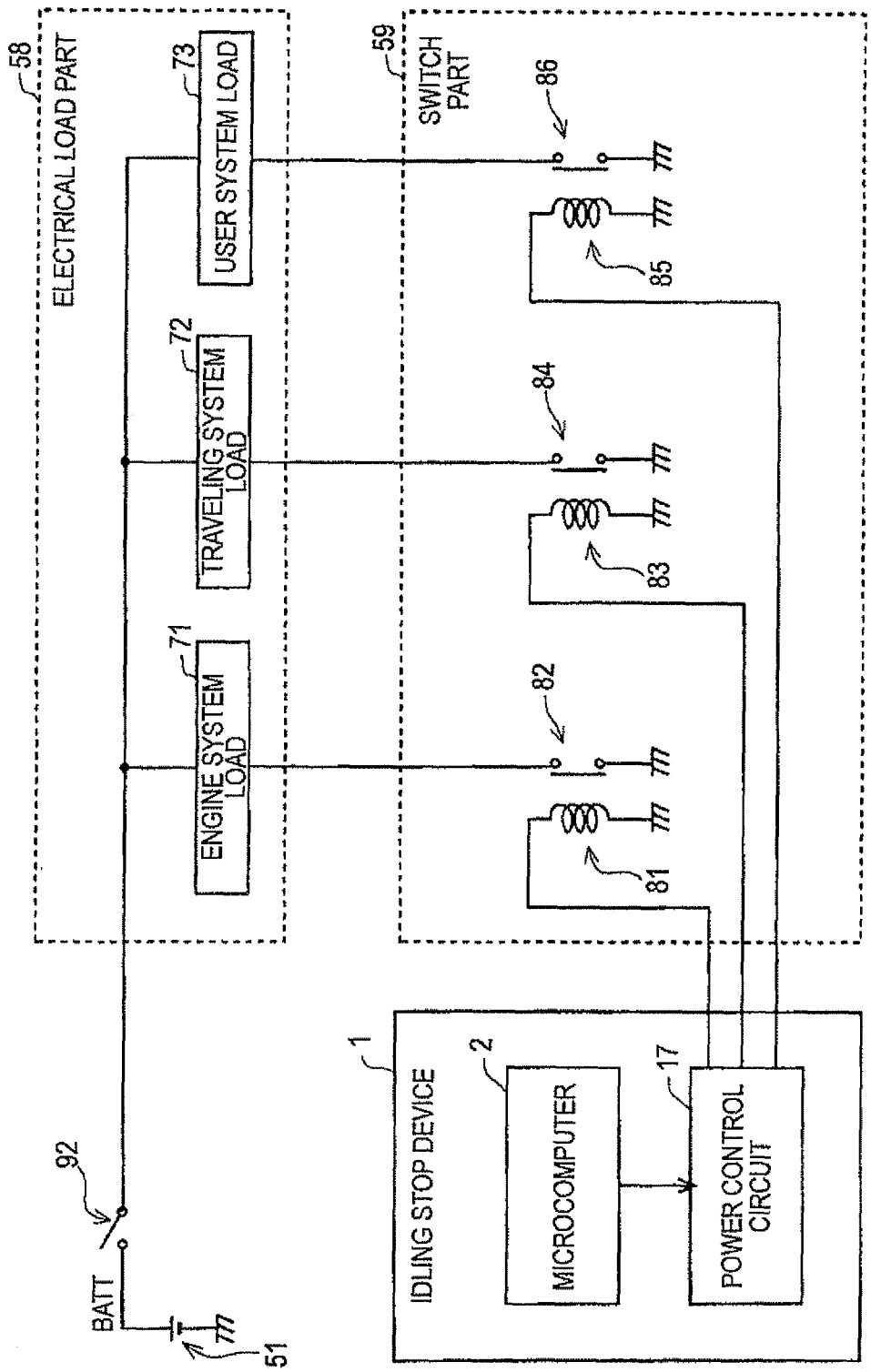
FIG. 2 is a view showing a detailed configuration of an electrical load part and a switch part.

FIG. 2 is a view showing a detailed configuration of the electrical load part 58 and the switch part 59. As shown in the figure, electrical loads included in the electrical load part 58 are divided into three groups: specifically an engine system load 71, a traveling system load 72 and a user system load 73.

The engine system load 71 includes electrical loads which have no direct relation with the starting of the engine 57 although they have a relation with the engine 57, such as, for example, an O$_2$ sensor heater, an electronic throttle control motor, an EGR motor, etc. In addition, in the first embodiment, the engine system load 71 does not include electrical loads which have a direct relation with the starting of the engine 57, such as an injector to inject fuel, an ignition plug to ignite fuel, etc.

The traveling load 72 includes electrical loads which have a relation with steering and brake required for traveling of the vehicle other than the engine 57, such as, for example, an electric power steering (EPS) controller, an anti-lock braking system (ABS) controller, etc.

The user system load 73 includes electrical loads which improve the user's level of comfort which have no direct relation with the traveling of the vehicle, such as, for example, an air conditioner, an audio system, a navigation system, etc.

The switch part 59 includes three relay switches 82, 84 and 86. These three relay switches 82, 84 and 86 are connected to ground sides of the engine system load 71, the traveling system load 72 and the user system load 73, respectively.

These three relay switches 82, 84 and 86 are of a normally-close type in which they are switched on in a normal condition but are switched off when corresponding relay coils 81, 83 and 85 are electrically connected. The relay coils 81, 83 and 85 are electrically connected by the power control circuit 17 of the idling stop device 1. For example, when the relay coil 81 is electrically connected, the relay switch 82 is switched off to cut off power from the battery 51 to the engine system load 71.

With the above-described configuration, the microcomputer 2 of the idling stop device 1 can change supply/cut-off of power from the battery 51 to the three groups (the engine system load 71, the traveling system load 72 and the user system load 73) included in the electrical load part 58 for each group.

The idling stop function of the microcomputer 2 is a function of automatically stopping/starting the engine 57 of the vehicle based on a traveling state of the vehicle. As shown in FIG. 1, a signal indicating the traveling state of the vehicle is input from various sensors included in the vehicle to the microcomputer 2 via an interface 18. Specifically, as input signals, a vehicle speed is input from a vehicle speed sensor, a position of a shift lever is input from a shift sensor, handling contents of an accelerator sensor, and handling contents of a brake is input from a brake sensor.

If a predetermined stop condition is established based on these signals indicating such traveling states, the engine 57 is stopped by the idling stop function. For example, if all of various conditions including "vehicle speed: 0," "shift lever: 'D' or 'N'," "accelerator: not handled," and "brake: handled" are satisfied, it may be determined that the stop condition is established.

When the engine 57 is stopped by the idling stop function, the microcomputer 2 transmits a predetermined stop signal to an engine ECU 56 which controls the engine 57. The engine ECU 56 stops the engine 57 in response to the stop signal.

If a predetermined start condition is established based on the signals indicating the traveling states while the engine 57 is stopped by the idling stop function, the engine 57 is automatically started by the idling stop function. For example, if all of various conditions including "shift lever: 'D'," "accelerator: handled," and "brake: not handled" are satisfied, it may be determined that the start condition is established.

When the engine 57 is started with the idling stop function, the microcomputer 2 transmits a predetermined start signal to a starter control circuit 16 of the idling stop device 1. The starter control circuit 16 makes the relay coil 53 electrically connected in response to the start signal. When the relay coil 53 is electrically connected, the relay switch 54 connected to a starter motor 55 to start the engine 57 of the vehicle is switched on. Accordingly, power is supplied from the battery 51 to the starter motor 55 which is then driven to start the engine 57. In addition, the relay coil 53 may be electrically connected when a start switch 93 which can be manipulated by a user is switched on. When the user gets on the vehicle, the starter motor 55 is driven to start the engine 57 in response to the manipulation of the start switch 93.

In addition, the idling stop device 1 includes a regulator 11, being a circuit to supply power to the microcomputer 2, which drops an input voltage up to a predetermined voltage. The regulator 11 may be configured by a combination of a switching regulator and a series regulator.

While the power used for the microcomputer 2 is supplied from the battery 51 of the vehicle, an ideal voltage value of a power source of the microcomputer 2 is, for example, 5 V, whereas a normal voltage of the battery 51 is, for example, 12 V. Accordingly, the idling stop device 1 is configured to obtain a voltage VCC of the power source of the microcomputer 2 by dropping a voltage BATT of the battery 51 using the regulator 11.

In addition, the regulator 11 regulates an output voltage within a range of input voltage as an upper limit. If the input voltage is lower than a target voltage which has to remain constant, the output voltage of the regulator 11 is also lower than the target voltage. Accordingly, if the voltage BATT of the battery is decreased as the battery 51 is deteriorated, the voltage VCC of the power source of the microcomputer 2 which can be obtained by dropping the voltage BATT using the regulator 11 is also decreased.

In addition, the idling stop device 1 includes a circuit which resets the microcomputer 2, including a decreased voltage detecting part 13, a reset part 14 and a runaway detecting part 15.

The decreased voltage detecting part 13 is connected to a power line from the regulator 11 to the microcomputer 2 and monitors the power voltage VCC of the microcomputer 2. If the power voltage VCC of the microcomputer 2 is lower than s minimal operation voltage (hereinafter denoted by a symbol "Vt") at which the microcomputer 2 can be operated, the decreased voltage detecting part 13 outputs an instruction signal to the reset part 14 indicating that the microcomputer 2 has to be reset. The minimal operation voltage is, for example, 3.9 V. The decreased voltage detecting part 13 may be configured by, for example, a comparator which compares the voltage VCC with the minimal operation voltage Vt.

The runaway detecting part 15 detects whether or not the microcomputer 2 falls into a runaway state such as freezing. For example, the runaway detecting part 15 monitors an operation signal of a watchdog timer of the microcomputer 2 and, if a regular signal is not detected, determines that the microcomputer 2 is in the runaway state. In the runaway state, the microcomputer 2 cannot recover its own function without being reset. Accordingly, the runaway detecting part 15 outputs the instruction signal to the reset part 14 indicating that the microcomputer 2 has to be reset.

The reset part 14 outputs a reset signal to reset the microcomputer 2. The reset signal has normally a logic level "H" and resets the microcomputer 2 when it is set to be a logic level "L." Upon receiving the instruction signal indicating that the reset part 14 has to reset the microcomputer 2 from one of the decreased voltage detecting part 13 and the runaway detecting part 15, the reset part 14 sets the reset signal to "L." The microcomputer 2 continues to monitor the reset signal and is reset when the reset signal goes into "L." That is, the microcomputer 2 stops once and then restarts.

The idling stop device 1 includes a memory 3 which stores information indicating that the power voltage VCC of the microcomputer 2 is lower than the minimal operation voltage Vt (hereinafter referred to as "voltage decrease information") if the power voltage VCC is lower than the minimal operation voltage Vt. The instruction signal output from the decreased voltage detecting part 13 is also input to the memory 3. That is, if the power voltage VCC of the microcomputer 2 is lower than the minimal operation voltage Vt, the memory 3 is notified through the instruction signal that the power voltage VCC is lower than the minimal operation voltage Vt and the voltage decrease information is stored in the memory 3 in response to the notification.

The memory 3 may be configured by, for example, a flip-flop which is a logic circuit to store information of one bit. A minimal operation voltage of the memory 3 is set to 1.6 V, for example, which is lower than the minimal operation voltage Vt (for example, 3.6 V) of the microcomputer 2. That is, the memory 3 can still hold its own stored contents even when a power voltage of the memory 3 is lower than the minimal operation voltage Vt of the microcomputer 2. Accordingly, the memory 3 can store the voltage decrease information even during reset of the microcomputer 2 irrespective of a state of the microcomputer 2.

While the microcomputer 2 is reset if the power voltage VCC is lower than the minimal operation voltage Vt as the voltage of the battery 51 is decreased, the voltage decrease information is stored in the memory 3 in the meantime. After being reset, based on the voltage decrease information stored in the memory 3, the microcomputer 2 can determine that the power voltage VCC before being reset is lower than the minimal operation voltage Vt.

<Reset Process>

Figure 3:
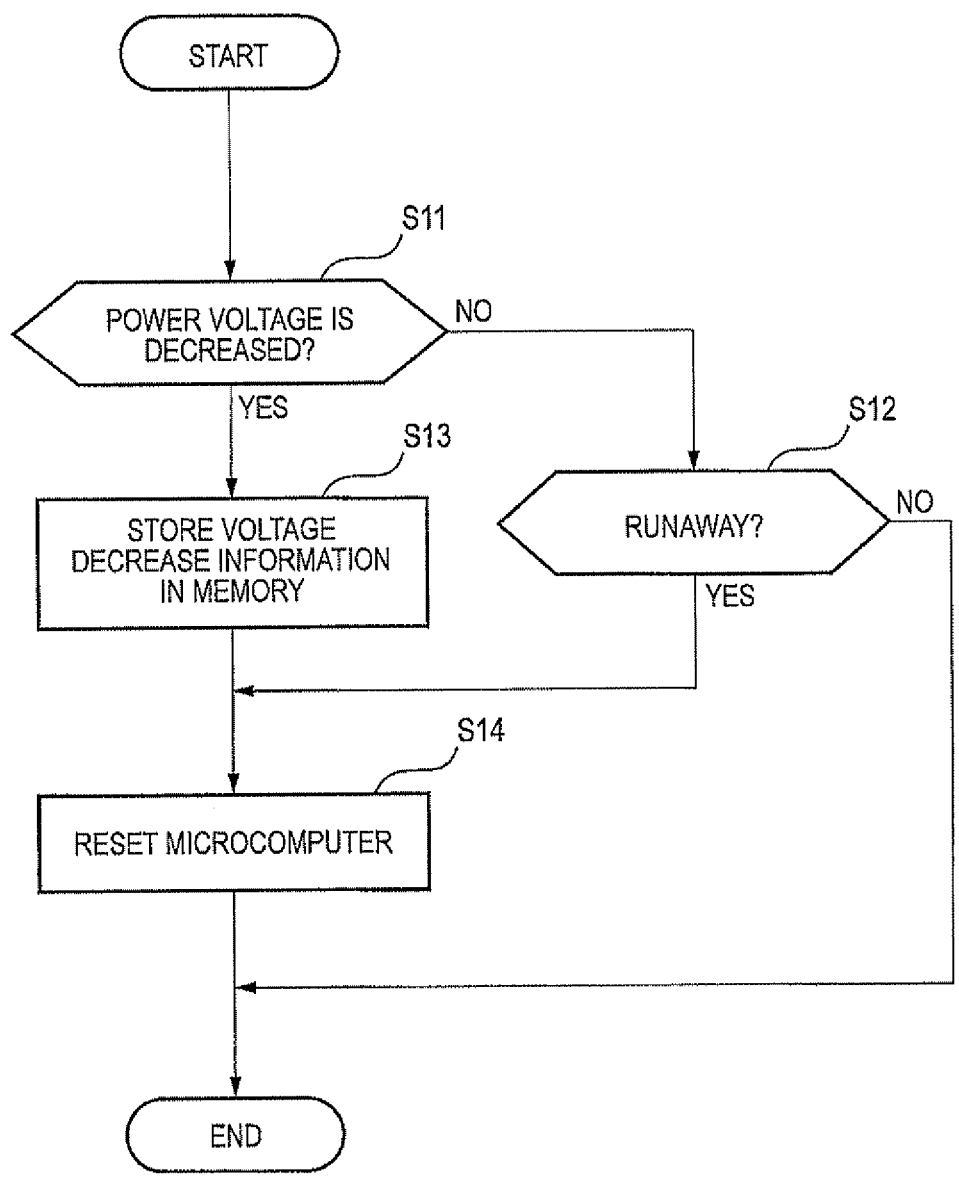
FIG. 3 is a flow chart showing a flow of process of an idling stop device when a microcomputer is reset.

The phenomenon that the microcomputer 2 is reset as the voltage of the battery 51 is significantly decreased occurs when the engine 57 is started, for which the starter motor 55 requires very high power. Hereinafter, a process of the idling stop device 1 when the engine 57 is started by a user who manipulates the start switch 93 will be described. FIG. 3 is a flow chart showing a flow of process of the idling stop device 1. This process begins immediately after a user gets on a vehicle, at the point of which the engine 57 is not started while the idling stop device 1 is started.

First, it is determined whether or not a condition for resetting the microcomputer 2 during start of the engine 57 is established. Specifically, the decreased voltage detecting part 13 determines whether or not the power voltage VCC of the microcomputer 2 is lower than the minimal operation voltage Vt of the microcomputer 2 (Step S11). At the same time, the runaway detecting part 15 determines whether or not the microcomputer 2 falls into a runaway state (Step S12). If the power voltage VCC is equal to or higher than the minimal operation voltage Vt (No in Step S11) and the engine 57 is completely started without the microcomputer 2 being in the runaway state (No in Step S12), the process is ended.

If the power voltage VCC of the microcomputer 2 is lower than the minimal operation voltage Vt (Yes in Step S11), an instruction signal is output from the decreased voltage detecting part 13 to the reset part 14. The instruction signal is also input to the memory 3 and voltage decrease information is stored in the memory 3 in response to the instruction signal (Step S13).

On the other hand, even if the microcomputer 2 is in the runaway state (Yes in Step S12), an instruction signal is output from the decreased voltage detecting part 13 to the reset part 14.

Upon receiving the instruction signal from one of the decreased voltage detecting part 13 and the runaway detecting part 15, the reset part 14 sets the reset signal to "L." The microcomputer 2 is reset in response to the "L" reset signal (Step S14). If the voltage decrease information is stored in the memory 3, the memory 3 can still hold the voltage decrease information even during reset of the microcomputer 2.

Thereafter, the microcomputer 2 is restarted. Based on whether or not the voltage decrease information is stored in the memory 3, the restarted microcomputer 2 can detect the cause of the reset. That is, if the voltage decrease information is not stored in the memory 3, it may be determined that the reset is attributed to the runaway state. Conversely, if the voltage decrease information is stored in the memory 3, it may be determined that the reset is attributed to the power voltage VCC being lower than the minimal operation voltage Vt.

Figure 4:
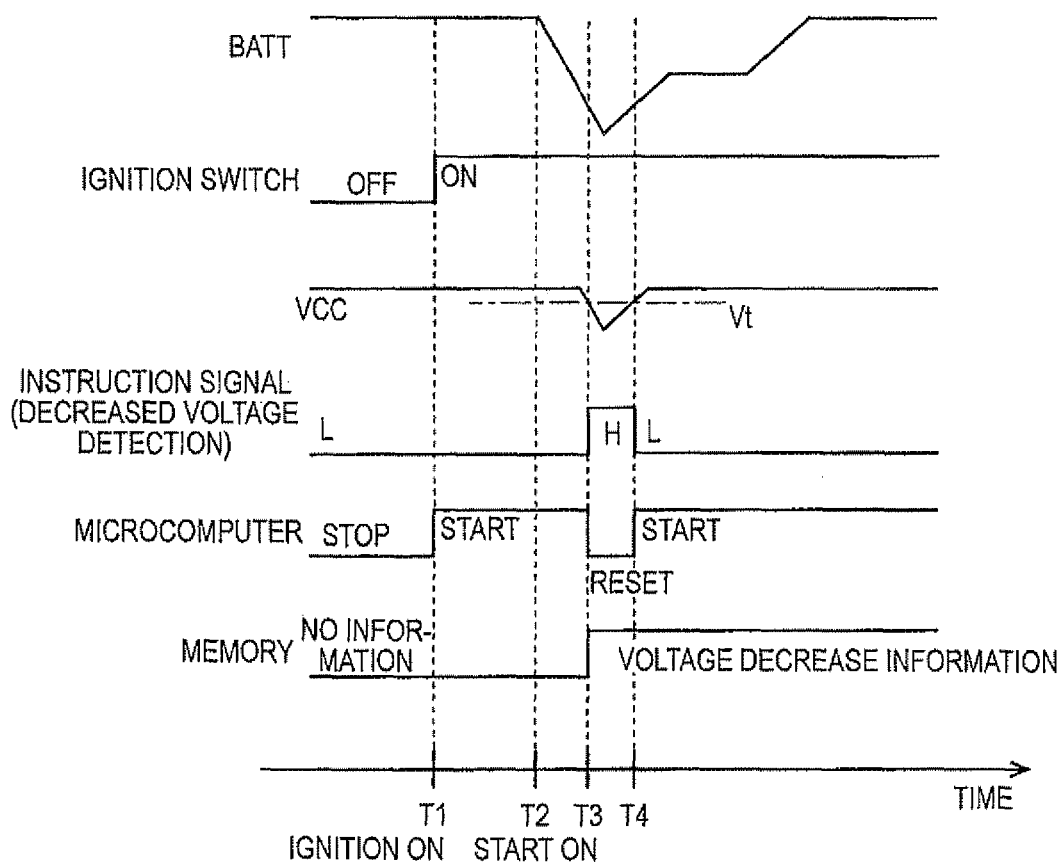
FIG. 4 is a view showing variation of various signals when the microcomputer is reset.

FIG. 4 is a time chart showing variation of various signals in a case where the voltage of the battery 51 is decreased when the engine 57 is started. At the starting point in this chart, the ignition switch 92 is switched off and the engine 57 is not started.

First, at a point T1, a user switches the ignition switch 92 on. Accordingly, power is supplied from the battery 51 to the idling stop device 1 and the microcomputer 2 begins to operate.

Next, at a point T2, the user switches the start switch 93 on, thereby driving the starter motor 55. As the starter motor 55 is driven, the voltage BATT of the battery 51 is decreased. Accordingly, the voltage of the power line 91 is decreased. In addition, if the battery 51 is deteriorated, the power voltage VCC of the microcomputer 2 is accordingly decreased.

In this manner, if the power voltage VCC of the microcomputer 2 is decreased to be lower than the minimal operation voltage Vt of the microcomputer 2 at a point T3, the decreased voltage detecting part 13 detects the power voltage VCC lower than the minimal operation voltage Vt and generates an instruction signal (i.e., sets the instruction signal to "H"). Accordingly, the reset part 14 sets a reset signal to "L" and the microcomputer 2 stops to operate for reset. At the same time, the instruction signal from the decreased voltage detecting part 13 is also input to the memory 3 and the voltage decrease information is stored in the memory 3. Thereafter, the voltage decrease information is still held in the memory 3 irrespective of a state of the microcomputer 2.

Thereafter, when a load of the starter motor 55 is decreased with rotation of the engine 57, the voltage BATT of the battery 51 is slowly increased. Accordingly, the voltage of the power line 91 and the power voltage VCC of the microcomputer 2 are also increased. If the power voltage CC of the microcomputer 2 is increased to be equal to or higher than the minimal operation voltage Vt of the microcomputer 2 at a point of T4, the decreased voltage detecting part 13 stops the instruction signal (i.e., sets the instruction signal to "L"). Upon receiving this instruction signal, the reset part 14 sets the reset signal to "H," thereby restarting the microcomputer 2. Thereafter, based on the voltage decrease information stored in the memory 3, the restarted microcomputer 2 can detect that the voltage of the battery 51 is lower than its normal voltage due to deterioration of the battery 51.

<Idling Stop Process>

If the voltage decrease information is stored in the memory 3, the microcomputer 2 after being reset executes a measure to prevent the voltage of the battery 51 from being decreased when the engine 57 is started with the idling stop function so that the idling stop function can be maintained. Specifically, the microcomputer 2 performs a power control function to stop supply of power to some of electrical loads to which power is supplied from the battery 51. Hereinafter, such a process will be described.

Figure 5:
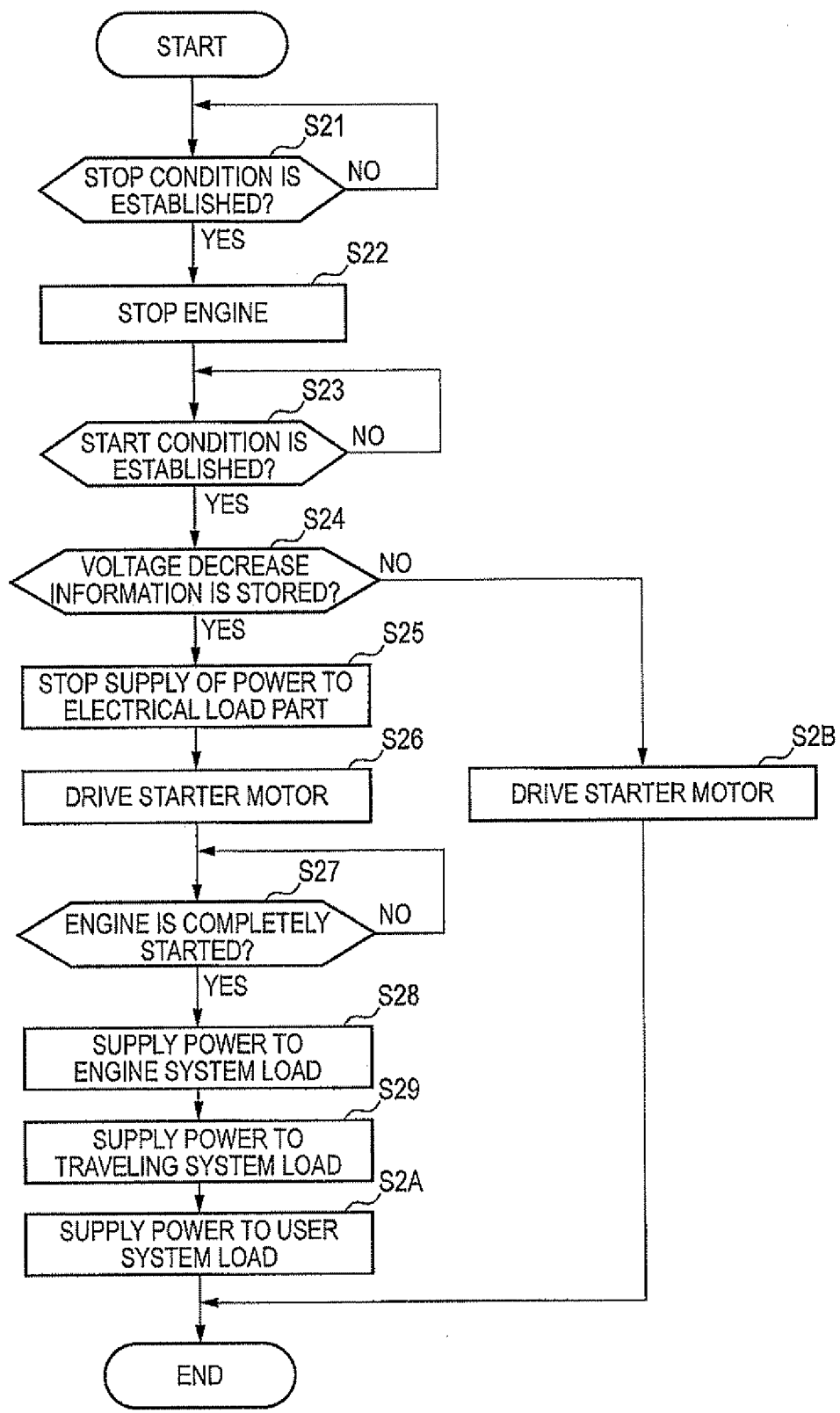
FIG. 5 is a flow chart showing a flow of idling stop function-related process of an idling stop device.

FIG. 5 is a flow chart showing a flow of idling stop function and power control function-related process of the idling stop device 1. This process begins when the engine 57 is started.

First, based on a signal indicating an input traveling state, the microcomputer 2 determines whether or not a stop condition is established (Step S21). If the stop condition is established, the microcomputer 2 transmits a stop signal to the engine ECU 56 which then stops the engine 57 in response to the stop signal (Step S22).

Thereafter, based on the signal indicating the input traveling state, the microcomputer 2 determines whether or not a start condition is established (Step S23). If the start condition is established, then the microcomputer 2 determines whether or not voltage decrease information is stored in the memory 3 (Step S24).

If no voltage decrease information is stored in the memory 3, which means that the battery 51 is normal, as usual, the microcomputer 2 transmits a start signal to the starter control circuit 16 to drive the starter motor 55 and start the engine 57 (Step S2B).

On the other hand, if the voltage decrease information is stored in the memory 3, which means that the battery 51 is deteriorated, first, supply of power from the battery 51 to all groups of loads included in the electrical load part 58 is stopped (Step S25).

Specifically, the microcomputer 2 transmits a predetermined control signal to the power control circuit 17. In response to this control signal, the power control circuit 17 makes the three relay coils 81, 83 and 85 of the switch part 59 electrically connected. Accordingly, all of the three relay switches 82, 84, and 86 of the switch part 59 are switched off, thereby stopping supply of power from the battery 51 to all of the three groups of loads (the engine system load 71, the traveling system load 72 and the user system load 73) included in the electrical load part 58.

The electrical loads to which the supply of power is stopped in this manner are some, not all, of electrical loads to which power is supplied from the battery 51. Power continues to be supplied to electrical loads required to start the engine 57, such as the idling stop device 1, the engine ECU 56, the injector, the ignition plug, etc.

When the supply of power to the electrical load part 58 is stopped, the microcomputer 2 continues to transmit the start signal to the starter control circuit 16 to drive the starter motor 55 (Step S26). At this time, since the supply of power to the electrical load part 58 is stopped, the voltage of the battery 51 can be prevented from being significantly decreased, thereby allowing the electrical loads required to start the engine 57, including the starter motor 55, to preferentially use the power of the battery 51. As a result, it is possible to prevent the microcomputer 2 from being reset, thereby allowing the engine 57 to be started.

Next, it is determined whether or not the engine 57 is completely started (Step S27). The determination on the complete start of the engine 57 may be made depending on whether or not the voltage of the battery 51 is increased, whether or not rpm (revolution per minute) of the engine exceeds a predetermined value (for example, 500 rpm), etc.

If the engine 57 is completely started, the start motor 55 is stopped. At the same time, supply of power to the engine system load 71 is started (Step S28). Specifically, the microcomputer 2 transmits a predetermined control signal to the power control circuit 17 which then makes the relay coil 81 of the switch part 59 electrically disconnected in response to the control signal. Accordingly, the relay switch 82 is switched on, thereby allowing power to be supplied from the battery 51 to the engine system load 71.

Next, supply of power to the traveling system load 72 is started with a predetermined interval from the start of the supply of power to the engine system load 71 (Step S29). Specifically, the microcomputer 2 transmits a predetermined control signal to the power control circuit 17 which then makes the relay coil 83 of the switch part 59 electrically disconnected in response to the control signal. Accordingly, the relay switch 84 is switched on, thereby allowing power to be supplied from the battery 51 to the traveling system load 72.

In addition, supply of power to the user system load 73 is started with a predetermined interval from the start of the supply of power to the traveling system load 72 (Step S2A). Specifically, the microcomputer 2 transmits a predetermined control signal to the power control circuit 17 which then makes the relay coil 85 of the switch part 59 electrically disconnected in response to the control signal. Accordingly, the relay switch 86 is switched on, thereby allowing power to be supplied from the battery 51 to the user system load 73.

Thus, power is supplied to all of the electrical loads to which supply of power is stopped when the engine 57 is started, thereby returning the vehicle to its normal state.

Figure 6:
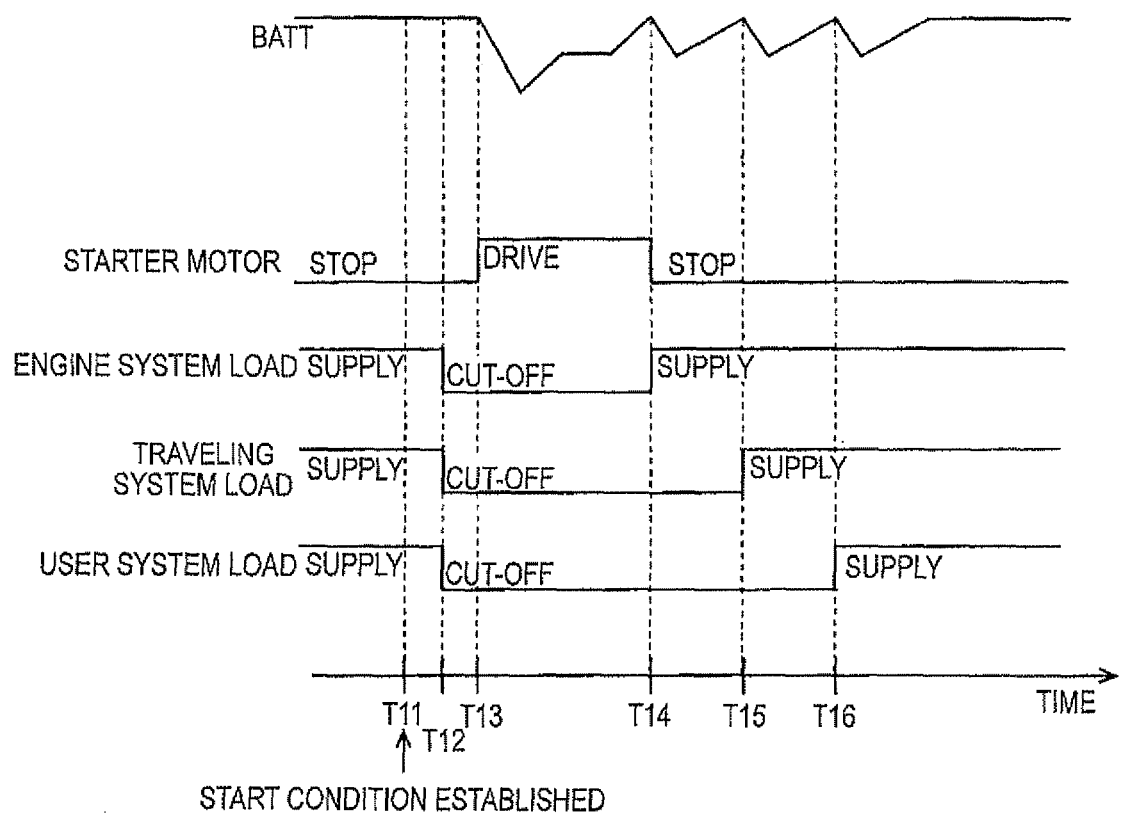
FIG. 6 is a view showing states of electrical loads when an engine is started with an idling stop function.

FIG. 6 is a time chart showing states of various electrical loads when the engine 57 is started with the idling stop function when the voltage decrease information is stored in the memory 3. At the starting point in this chart, the engine 57 is stopped with the idling stop function.

First, at a point T11, a start condition is established. In response to this, if it is confirmed that the voltage decrease information is stored in the memory 3, supply of power to the engine system load 71, the traveling system load 72 and the user system load 73 of the electrical load part 58 is stopped at a point T12.

At a point T13, the starter motor 55 is driven. While the voltage BATT of the battery 51 is decreased with the driving of the starter motor 55, since the supply of power to the electrical load part 58 is stopped, the voltage of the battery 51 can be prevented from being significantly decreased.

At a point T14, if it is confirmed that the engine 57 is completely started, the starter motor 55 is stopped. Thereafter, supply of power to each group of electrical loads is started with a predetermined interval. That is, supply of power to the engine system load 71 is started at the point T14, supply of power to the traveling system load 72 is started at a point T15, and supply of power to the user system load 73 is started at a point T16.

At the start points of the supply of power to respective groups (the points T14, T15 and T16), although the voltage BATT of the battery 51 is decreased but not suddenly and greatly, it is quickly increased to a predetermined voltage. This is because power starts to be not simultaneously supplied to all of the groups of electrical loads but starts to be supplied to each group with the predetermined interval. If the simultaneous supply of power to all of the three groups is started, a large load is likely to be suddenly imposed on the battery 51 due to sudden rising of a current, thereby significantly decreasing the voltage of the battery 51. In the first embodiment, by starting the supply of power to each group with an interval, it is possible to prevent the voltage of the battery 51 from being significantly decreased.

As described above, in the idling stop device 1 of the first embodiment, if the voltage of the battery 51 is decreased such that the power voltage VCC of the microcomputer 2 is lower than the minimal operation voltage Vt of the microcomputer 2, the microcomputer 2 is reset. In the meantime, the voltage decrease information is stored in the memory 3. Accordingly, based on the voltage decrease information, the microcomputer 2 after being reset can detect that the voltage of the battery 51 is decreased. Thereafter, the microcomputer 2 stops the supply of power to the electrical load part 58 when the engine 57 is started with the idling stop function. This can prevent the voltage of the battery from being significantly decreased when the engine 57 is started, thereby maintaining the idling stop function.

In addition, since the supply of power to the electrical load part 58 is started after it is confirmed that the engine 57 is completely started, it is possible to prevent the voltage of the battery from being significantly decreased due to a large load imposed on the battery during start of the engine 57.

In addition, by starting the supply of power to each group of electrical load part 58 with an interval, it is possible to prevent a large load from being suddenly imposed on the battery 51 and hence the voltage of the battery 51 from being significantly decreased.

In addition, since the supply of power is started from the engine system load 71 related to the engine 57, the engine 57 can be quickly operated in a normal state. In addition, since the supply of power to the traveling system load 72 is started earlier than the supply of power to the user system load 73, the vehicle can be more quickly started.

<Modifications>

Although the first embodiment of the present invention has been described heretofore, the present invention is not limited to the first embodiment but various modifications may be made. Hereinafter, such modifications will be described. All features of the present invention, including the features described in the first embodiment and features to be described in the following description, may be appropriately combined.

While it has been illustrated in the first embodiment that the supply of power to the electrical load part 58 is started after the engine 57 is completely started, the supply of power to the electrical load part 58 may be started before the engine 57 is completely started.

In addition, while it has been illustrated in the first embodiment that the supply of power to the electrical loads is started for each group of the electrical load part 58 with a regular interval, this interval may be not regular. For example, when the voltage of the battery 51 is monitored, if the voltage of the battery 51 is equal to or higher than a predetermined threshold value after starting the supply of power to the engine system load 71, the supply of power to the traveling system load 72 may be started. Alternatively, if the voltage of the battery 51 is equal to or higher than a predetermined threshold value after starting the supply of power to the traveling system load 72, the supply of power to the user system load 73 may be started.

In addition, the power voltage of the memory 3 may be directly supplied from the battery 51 or a nonvolatile memory such as an EEPROM or a flash memory may be employed as the memory 3. In this case, the voltage decrease information may be stored in the memory 3 irrespective of switching on/off of the ignition switch. As a result, in addition to starting the engine 57 with the idling stop function, even when a user starts the engine 57, the supply of power to some of the electrical loads is stopped when the engine 57 is started, thereby preventing the voltage of the battery 51 from being significantly decreased.

In addition, while it has been illustrated in the first embodiment that the memory 3 is configured by the logic circuit to store information of one bit, a memory having a relatively large capacity may be employed as the memory 3. However, as in the first embodiment, when the memory 3 is configured by a single logic circuit to store information of one bit, the memory 3 may be implemented at a very low cost.

In addition, while it has been illustrated in the first embodiment that various functions are implemented by software by the program-based operation of the CPU, some of these functions may be implemented by electrical hardware circuits. On the contrary, some of functions implemented by hardware circuits may be implemented by software.

[Second Embodiment]

Hereinafter, a second embodiment of the present invention will be described with reference to the drawings.

Figure 7:
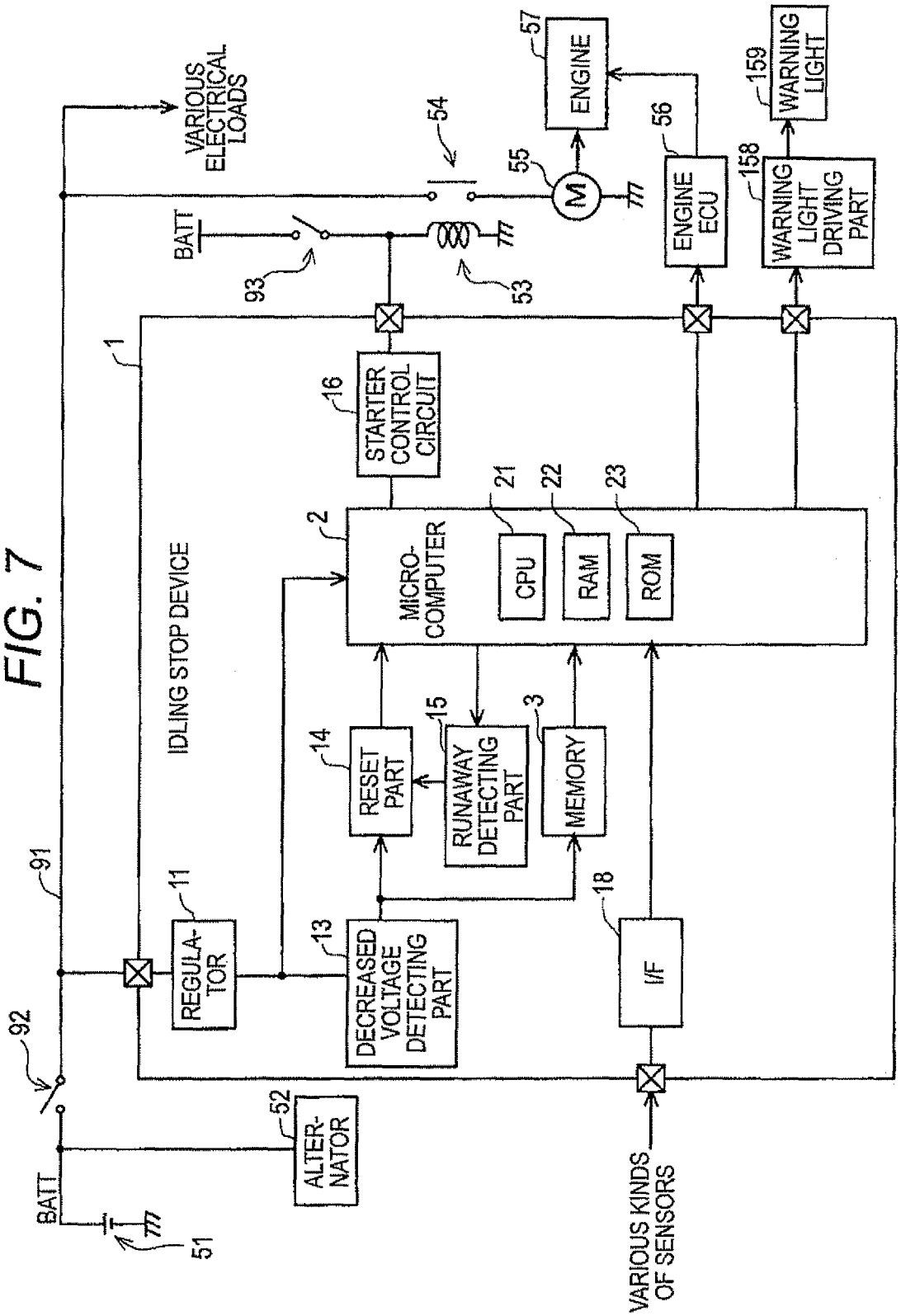
FIG. 7 is a block diagram showing a configuration of an idling stop device according to a second embodiment.

FIG. 7 is a block diagram showing a configuration of an idling stop device 1 and its peripheral components according to a second embodiment. The idling stop device 1 of the second embodiment has similar configuration and process as that of the first embodiment, and therefore differences with the first embodiment will be hereinafter focused upon.

In the idling stop device 1 according to the second embodiment, a warning light 159 which is turned on/off to notify a user of information indicating deterioration of the battery 51 is provided at a position observable within the vehicle by the user. The warning light 159 is turned on/off by a warning light driving part 158.

In the second embodiment, the functions of the microcomputer 2 include not only a power control function and an idling stop function but also a warning function of turning on the warning light 159.

While the microcomputer 2 is reset if the power voltage VCC is lower than the minimal operation voltage Vt as the voltage of the battery 51 is decreased, the voltage decrease information is stored in the memory 3 in the meantime. After being reset, based on the voltage decrease information stored in the memory 3, the microcomputer 2 can determine that the power voltage VCC before being reset is lower than the minimal operation voltage Vt.

Accordingly, if the voltage decrease information is stored in the memory 3, the microcomputer 2 after being reset notifies the user of deterioration information indicating deterioration of the battery 51, thereby allowing the user to replace the battery 51 with a new one. Specifically, the microcomputer 2 transmits a predetermined lighting signal to a warning light driving part 158 using a warning function. The warning light driving part 158 turns the warning light 159 on/off in response to this signal. Accordingly, the user within the vehicle is notified of the deterioration information indicating the deterioration of the battery 51.

The phenomenon that the voltage of the battery 51 is significantly decreased occurs when the engine 57 is started, for which the starter motor 55 requires very high power. Hereinafter, a process performed when the voltage of the battery 51 is significantly decreased and the microcomputer 2 is reset at the time of starting the engine 57 will be described in detail.

<Process>

Figure 8:
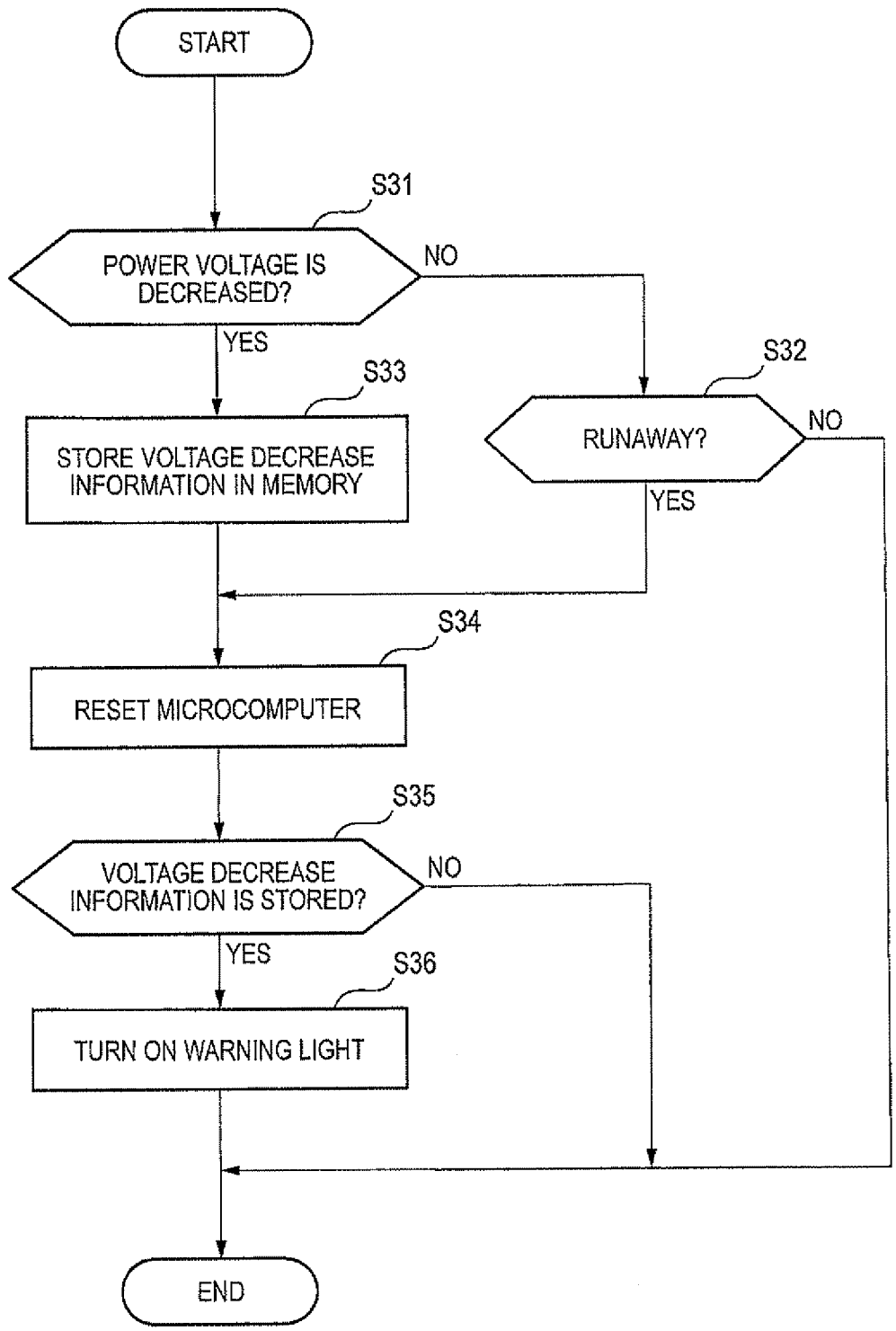
FIG. 8 is a flow chart showing a flow of process of the idling stop device according to the second embodiment.

FIG. 8 is a flow chart showing a flow of process of the idling stop device 1 regarding the reset of the microcomputer 2.

First, it is determined whether or not a condition for resetting the microcomputer 2 is established. Specifically, the decreased voltage detecting part 13 determines whether or not the power voltage VCC of the microcomputer 2 is lower than the minimal operation voltage Vt of the microcomputer 2 (Step S31). At the same time, the runaway detecting part 15 determines whether or not the microcomputer 2 falls into a runaway state (Step S32). If the power voltage VCC is equal to or higher than the minimal operation voltage Vt (No in Step S31) and the microcomputer 2 is not in the runaway state (No in Step S32), the process is ended.

If the power voltage VCC of the microcomputer 2 is lower than the minimal operation voltage Vt (Yes in Step S31), an instruction signal is output from the decreased voltage detecting part 13 to the reset part 14. The instruction signal is also input to the memory 3 and voltage decrease information is stored in the memory 3 in response to the instruction signal (Step S33).

On the other hand, even if the microcomputer 2 is in the runaway state (Yes in Step S32), an instruction signal is output from the decreased voltage detecting part 13 to the reset part 14.

Upon receiving the instruction signal from one of the decreased voltage detecting part 13 and the runaway detecting part 15, the reset part 14 sets the reset signal to "L." The microcomputer 2 is reset in response to the "L" reset signal (Step S34). If the voltage decrease information is stored in the memory 3, the memory 3 can still hold the voltage decrease information even during reset of the microcomputer 2.

Thereafter, the microcomputer 2 is restarted. The restarted microcomputer 2 determines whether or not the voltage decrease information is stored in the memory 3 (Step S35). If the voltage decrease information is not stored in the memory 3 (No in Step S35), it is determined that the microcomputer 2 is reset due to its runaway state, and then the process is ended.

On the other hand, if the voltage decrease information is stored in the memory 3 (Yes in Step S35), it is determined that the microcomputer 2 is reset due to the power voltage VCC being lower than the minimal operation voltage Vt. This may means that the voltage of the battery 51 is lower than its normal voltage due to deterioration of the battery 51. Accordingly, in order to allow the user to replace the battery 51 with a new one, the microcomputer 2 uses the warning function to transmit the predetermined lighting signal to the warning light driving part 158 which then turns on the warning light 159 (Step S36).

Figure 9:
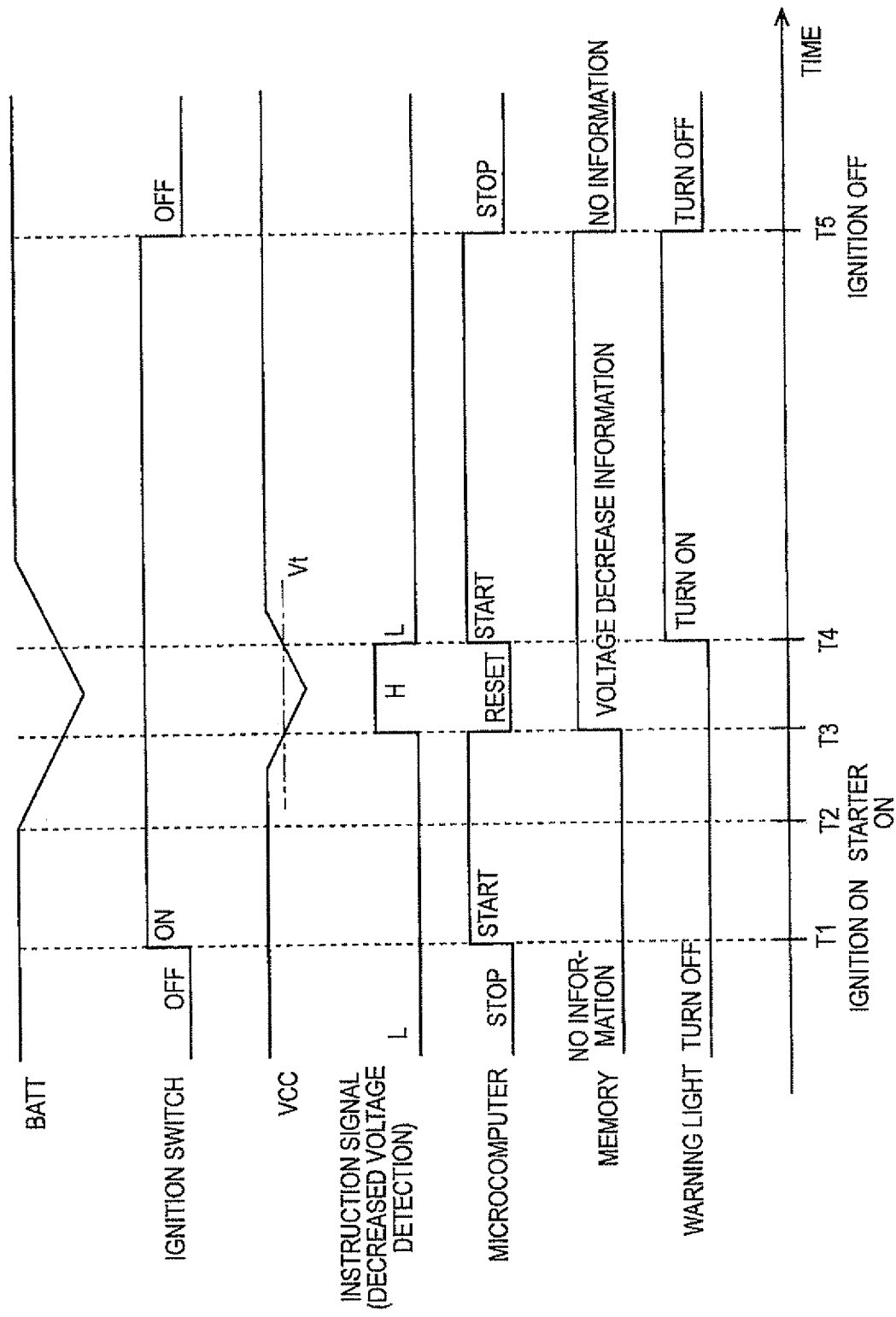
FIG. 9 is a view showing variation of various signals when the voltage of a battery is decreased.

FIG. 9 is a time chart showing variations of various signals in a case where the voltage of the battery 51 is decreased when the engine is started. At the starting point in this chart, the ignition switch 92 is switched off, the engine 57 is not started, and the warning light 159 is turned off.

First, at a point T1, a user switches the ignition switch 92 on. Accordingly, power is supplied from the battery 51 to the idling stop device 1 and the microcomputer 2 begins to operate.

Next, at a point T2, the user switches the start switch 93 on, thereby driving the starter motor 55. As the starter motor 55 is driven, the voltage BATT of the battery 51 is decreased. Accordingly, the voltage of the power line 91 is decreased. In addition, if the battery 51 is deteriorated, the power voltage VCC of the microcomputer 2 is accordingly decreased.

In this manner, if the power voltage VCC of the microcomputer 2 is decreased to be lower than the minimal operation voltage Vt of the microcomputer 2 at a point T3, the decreased voltage detecting part 13 detects the power voltage VCC lower than the minimal operation voltage Vt and generates an instruction signal (i.e., sets the instruction signal to "H"). Accordingly, the reset part 14 sets a reset signal to "L" and the microcomputer 2 stops to operate for reset. At the same time, the instruction signal from the decreased voltage detecting part 13 is also input to the memory 3 and the voltage decrease information is stored in the memory 3.

Thereafter, when a load of the starter motor 55 is decreased with rotation of the engine 57, the voltage BATT of the battery 51 is slowly increased. Accordingly, the voltage of the power line 91 and the power voltage VCC of the microcomputer 2 are also increased. If the power voltage CC of the microcomputer 2 is increased to be equal to or higher than the minimal operation voltage Vt of the microcomputer 2 at a point of T4, the decreased voltage detecting part 13 stops the instruction signal (i.e., sets the instruction signal to "L"). Upon receiving this instruction signal, the reset part 14 sets the reset signal to "H," thereby restarting the microcomputer 2.

The restarted microcomputer 2 confirms that the voltage decrease information is stored in the memory 3, and then transmits the predetermined lighting signal to the warning light driving part 158 using the warning function. Accordingly, by turning on the warning light 159 after a point T4, the user within the vehicle is notified of the deterioration information indicating the deterioration of the battery 51.

At a point T5, when the user switches the ignition switch 52 off, the power voltage VCC of the microcomputer 2 becomes 0 to stop the operation of the microcomputer 2. In addition, the voltage decrease information is erased from the memory 3.

As described above, in the idling stop device 1 of the second embodiment, if the voltage of the battery 51 is decreased such that the power voltage VCC of the microcomputer 2 is lower than the minimal operation voltage Vt of the microcomputer 2, the microcomputer 2 is reset. In the meantime, the voltage decrease information is stored in the memory 3. Accordingly, based on the voltage decrease information, the microcomputer 2 after being reset can detect that the voltage of the battery 51 is decreased, and can notify the user within the vehicle of the deterioration information indicating the deterioration of the battery 51. This allows the user to take measures, including replacing the battery 51 with a new one.

In addition, since the deterioration information is indicated by the warning light 159 provided within the vehicle, the user within the vehicle (particularly, a driver who drives the vehicle) can be quickly notified of the deterioration of the battery 51.

[Third Embodiment]

Next, a third embodiment will be described. While it has been illustrated in the second embodiment that the user within the vehicle is notified of the deterioration information indicating the deterioration of the battery 51 by turning on the warning light 159, the third embodiment involves notifying a different user, for example, a car mechanic who repairs the vehicle, of the deterioration information. The idling stop device 1 of the third embodiment has similar configuration and process as that of the second embodiment, and therefore differences with the first and second embodiments will be hereinafter focused upon.

Figure 10:
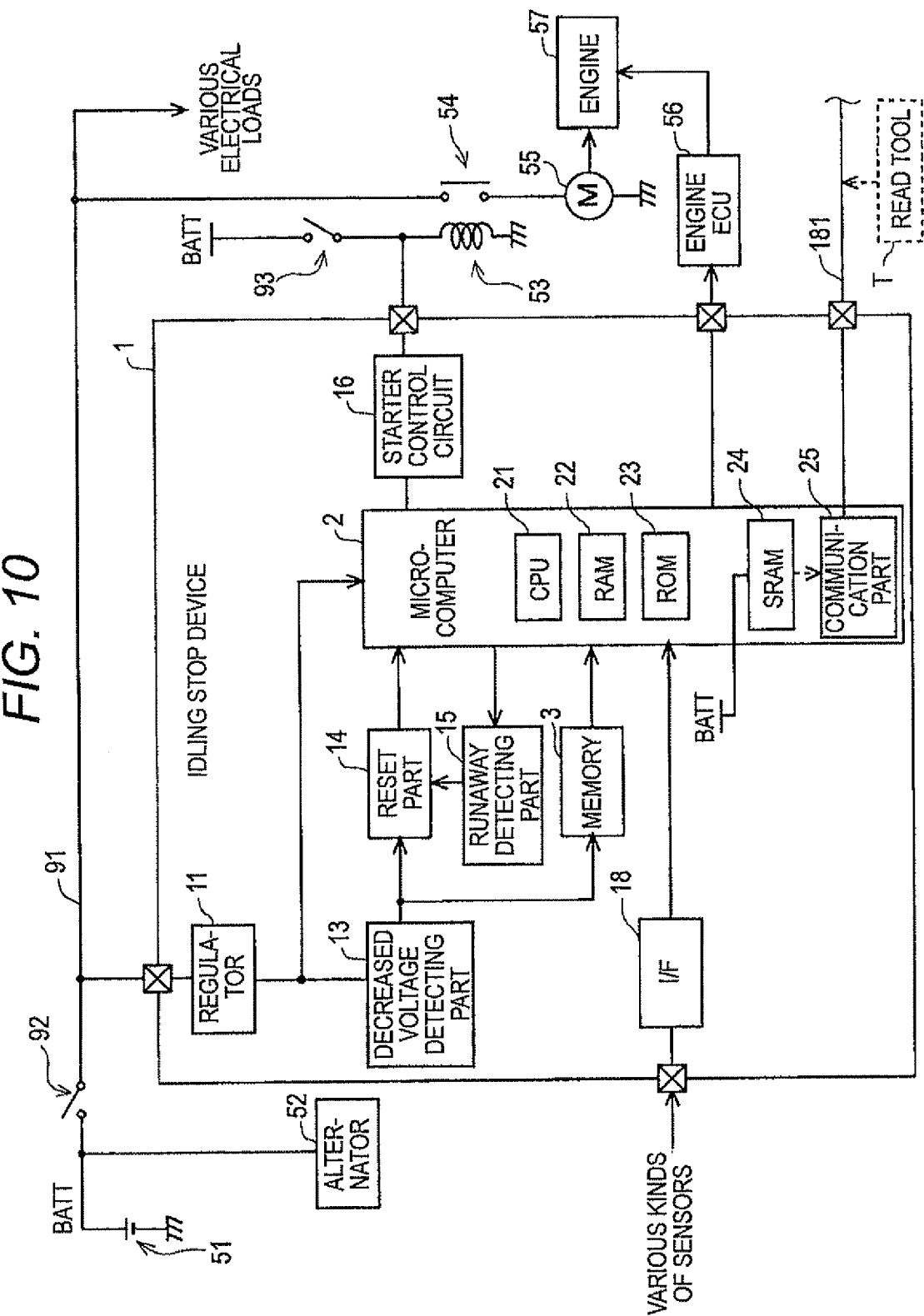
FIG. 10 is a block diagram showing a configuration of an idling stop device according to a third embodiment.

FIG. 10 is a block diagram showing a configuration of the idling stop device 1 and its peripheral components according to the third embodiment. In the third embodiment, the microcomputer 2 includes a CPU 21, a RAM 22, a ROM 23, a SRAM (standby RAM) 24 and a communication part 25.

The SRAM 24 is a memory device configured such that its power voltage is directly supplied from the battery 51. This configuration allows the SRAM 24 to hold its stored contents until the battery 51 is replaced with a new one, irrespective of the switching on/off of the ignition switch 52. Diagnosis codes indicating a variety of information related to the idling stop device 1 are stored in the SRAM 24.

The communication part 25 conducts communication with external devices via a communication line 81 for internal LAN of the vehicle. A user who repairs the vehicle may access a read tool T, which is an external device to read out diagnosis codes, via the communication line 81. Upon receiving a read signal from the read tool T via the communication line 81, the communication part 25 reads the diagnosis codes stored in the SRAM 24 in response to the read signal and transmits them to the read tool T. Thus, contents of the diagnosis codes are displayed in the read tool T.

In the third embodiment, if the voltage decrease information is stored in the memory 3, the deterioration information indicating the deterioration of the battery 51 is stored, as diagnosis codes, in the SRAM 24. As the diagnosis codes are read using the read tool T, the user is notified of the deterioration information indicating the deterioration of the battery 51.

Figure 11:
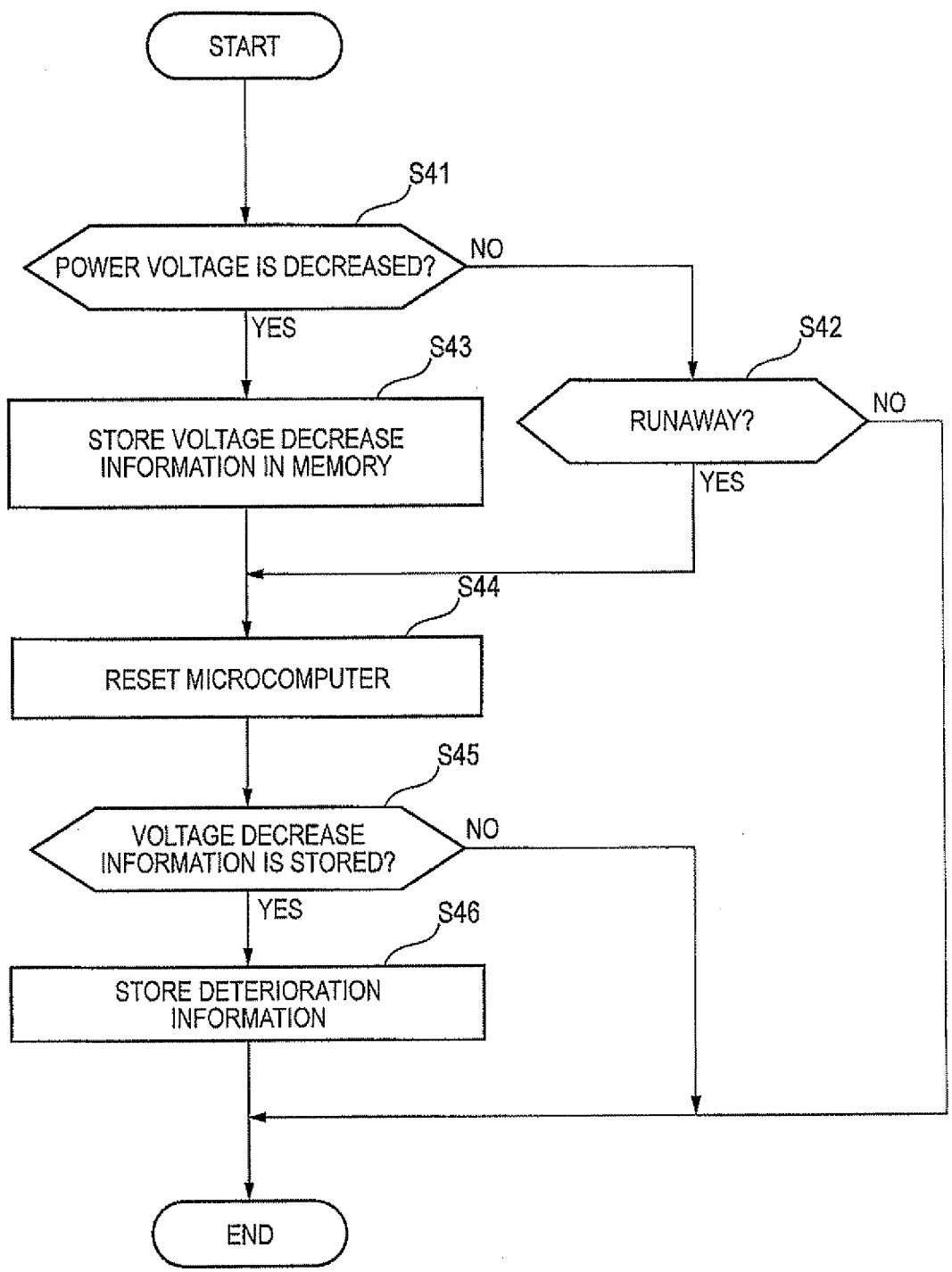
FIG. 11 is a flow chart showing a flow of process of the idling stop device according to the third embodiment.

FIG. 11 is a flow chart showing a flow of process of the idling stop device 1, which is related to the resetting of the microcomputer 2, according to the third embodiment. Steps S41 to S45 in this process are the same as Steps S31 to S35 of FIG. 8. This process further includes Step S46 unlike the second embodiment.

Specifically, the restarted microcomputer 2 determines whether or not the voltage decrease information is stored in the memory 3, and, if the voltage decrease information is stored in the memory 3 (Yes in Step S45), the microcomputer 2 stores the deterioration information indicating the deterioration of the battery 51, as the diagnosis codes, in the SRAM 24 (Step S46). The deterioration information stored in the SRAM 24 in this manner can be read by the read tool T connected to the communication line 81.

Figure 12:
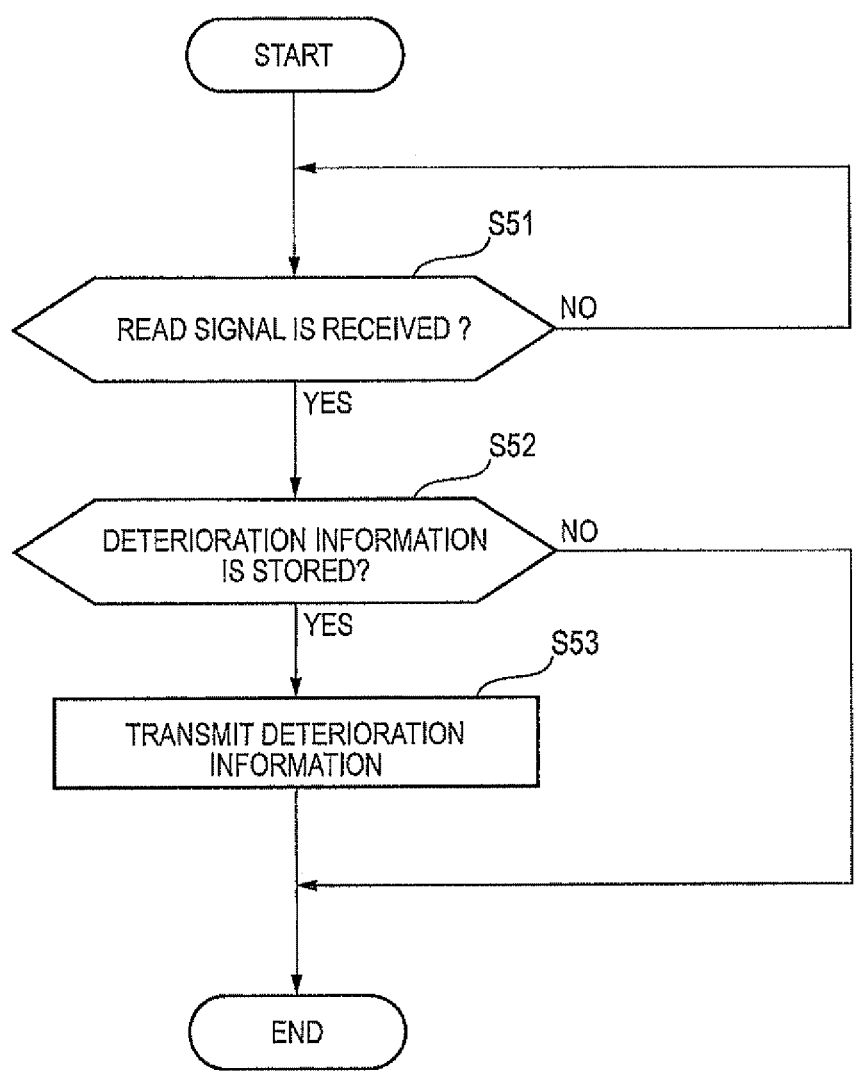
FIG. 12 is a flow chart showing a flow of process of an idling stop device when deterioration information is read.

FIG. 12 is a flow chart showing a flow of process of the idling stop device 1 when the deterioration information is read. This process is performed, for example when the vehicle is repaired.

First, it is determined whether or not the communication part 25 receives a read signal requiring read of diagnosis codes from the read tool T (Step S51).

If the communication part 25 receives the read signal (Yes in Step S51) and if the deterioration information is stored in the SRAM 24 (Yes in Step S52), the deterioration information is read and transmitted from the communication part 25 to the read tool T (Step S53).

Accordingly, the deterioration information is displayed in the read tool T, and thus, a user who handles the read tool T and repairs the vehicle can clearly detect the deterioration of the battery 51 and may take measures, including replacing the battery 51 with a new one.

<Modifications>

Although the second and third embodiments of the present invention have been described heretofore, the present invention is not limited to the second and third embodiments but various modifications may be made. Hereinafter, such modifications will be described. All features of the present invention, including the features described in the second and third embodiments and features to be described in the following description, may be appropriately combined.

While it has been illustrated in the second embodiment that the user within the vehicle is notified of the deterioration information and it has been illustrated in the third embodiment that the user who repairs the vehicle is notified of the deterioration information, the second and third embodiments may be combined to allow both of the user within the vehicle and the user who repairs the vehicle be notified of the deterioration information indicating the deterioration of the battery 51.

In addition, while it has been illustrated in the second embodiment that the warning light 159 is employed as an indication means for indicating the deterioration information, a navigator or any other suitable indication means which are provided within the vehicle may be employed.

In addition, while it has been illustrated in the second embodiment that the user is notified of the deterioration information through a visual indication, the user may be notified of the deterioration information through an audible warning call.

In addition, if the voltage decrease information is stored in the memory 3, the microcomputer 2 may invalidate the idling stop function thereafter. This may allow the alternator 52 to strengthen the charging of the battery and prevent the voltage of the battery 51 from being decreased.

In addition, the power voltage of the memory 3 may be directly supplied from the battery 51 or a nonvolatile memory such as an EEPROM or a flash memory may be employed as the memory 3. In this case, the voltage decrease information may be stored in the memory 3 irrespective of switching on/off of the ignition switch. Accordingly, if the microcomputer 2 is only once reset due to decrease in the voltage of the battery 51, the user can be notified of information indicating the deterioration of the battery 51 thereafter. If the battery 51 is replaced with a new one, the voltage decrease information may be erased from the memory 3. In addition, in this case, the deterioration information may be stored in the memory 3 and the voltage decrease information may be used as the deterioration information as it is.

In addition, a nonvolatile memory such as an EEPROM or a flash memory may be employed instead of the SRAM 24 of the second and third embodiments.

In addition, while it has been illustrated in the second embodiment that the memory 3 is configured by the logic circuit to store information of one bit, a memory having a relatively large capacity may be employed as the memory 3. However, as in the second embodiment, when the memory 3 is configured by a single logic circuit to store information of one bit, the memory 3 may be implemented at a very low cost.

In addition, while it has been illustrated in the second embodiment that various functions are implemented by software by the program-based operation of the CPU, some of these functions may be implemented by electrical hardware circuits. On the contrary, some of functions implemented by hardware circuits may be implemented by software.

[Fourth Embodiment]

Hereinafter, a fourth embodiment of the present invention will be described with reference to the drawings.

Figure 13:
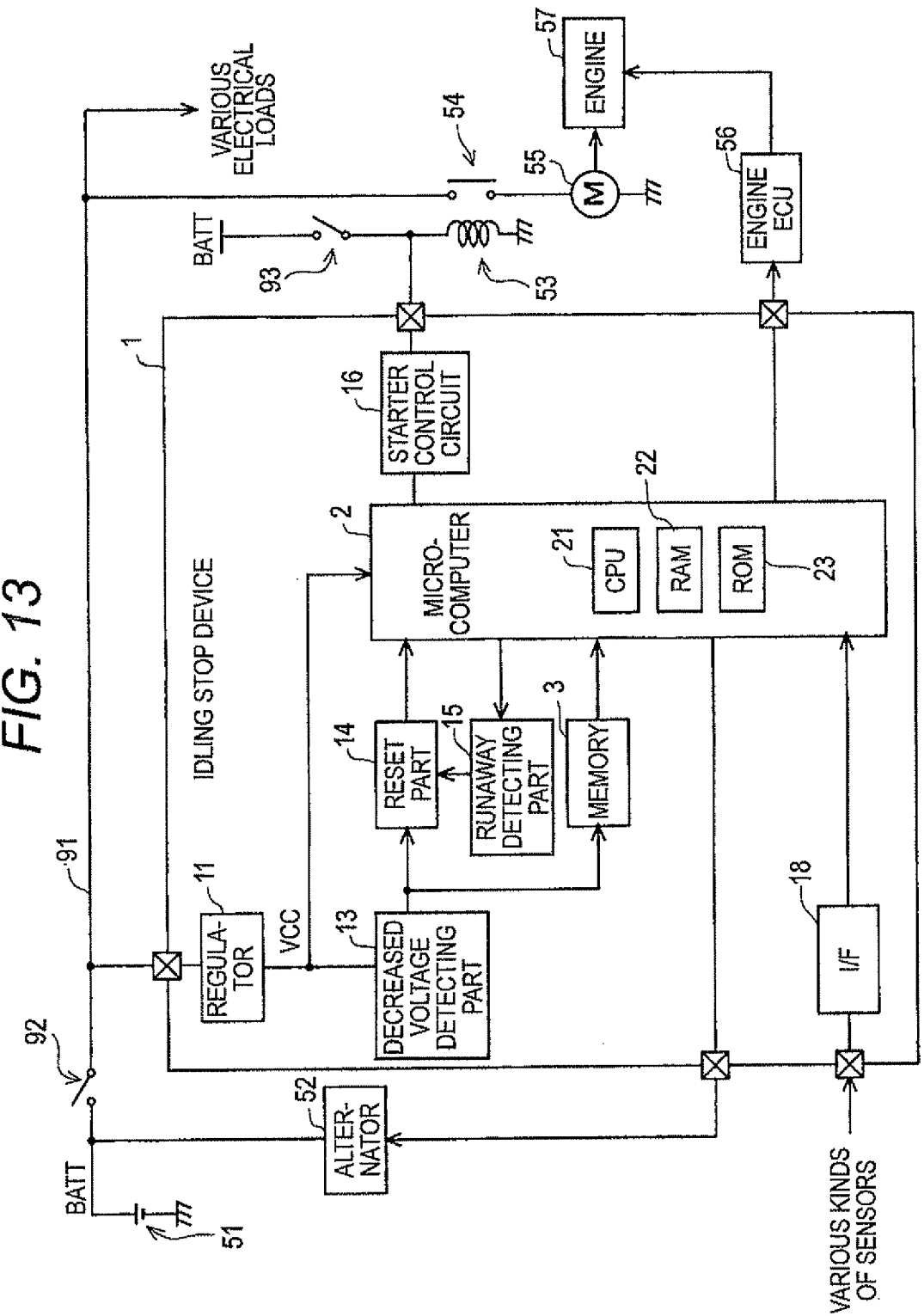
FIG. 13 is a block diagram showing a configuration of an idling stop device according to a fourth embodiment.

FIG. 13 is a block diagram showing a configuration of an idling stop device 1 and its peripheral components according to a fourth embodiment. The idling stop device 1 of the fourth embodiment has similar configuration and process as that of the first embodiment, and therefore differences with the first embodiment will be hereinafter focused upon.

In the fourth embodiment, the functions of the microcomputer 2 include not only a power control function and an idling stop function but also a target voltage changing function of changing a target voltage of the alternator 52.

While the microcomputer 2 is reset if the power voltage VCC is lower than the minimal operation voltage Vt as the voltage of the battery 51 is decreased, the voltage decrease information is stored in the memory 3 in the meantime. After being reset, based on the voltage decrease information stored in the memory 3, the microcomputer 2 can determine that the power voltage VCC before being reset is lower than the minimal operation voltage Vt.

Accordingly, if the voltage decrease information is stored in the memory 3, the microcomputer 2 after being reset executes a measure to increase the voltage of the battery 51 so that the idling stop function can be maintained. Specifically, the microcomputer 2 increases a target voltage of the alternator 52 over a normal voltage with the target voltage changing function.

The phenomenon that the voltage of the battery 51 is significantly decreased occurs when the engine 57 is started, for which the starter motor 55 requires very high power. Hereinafter, a process performed when the voltage of the battery 51 is significantly decreased and the microcomputer 2 is reset at the time of starting the engine 57 will be described in detail.

<Process>

Figure 14:
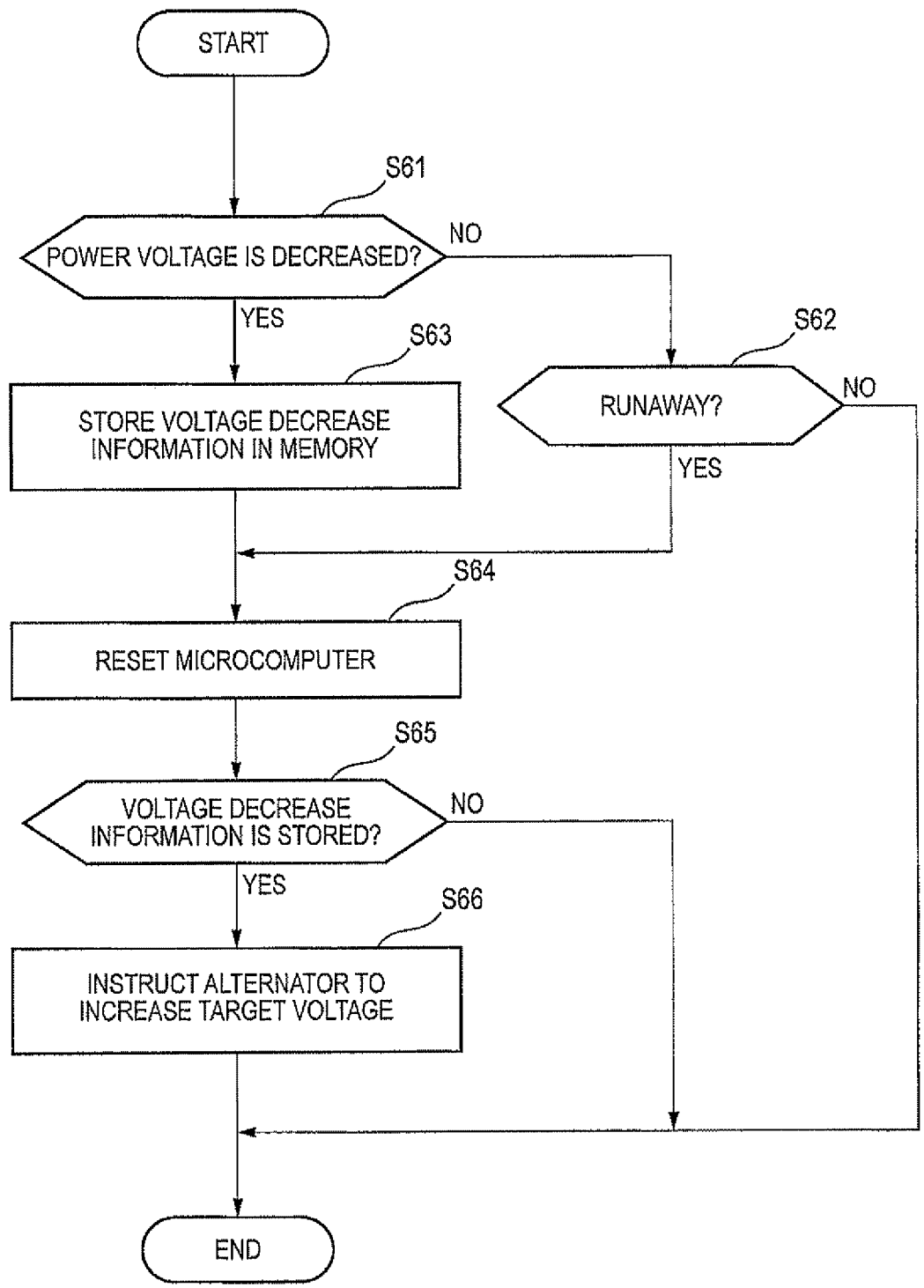
FIG. 14 is a flow chart showing a flow of process of an idling stop device according to the fourth embodiment.

FIG. 14 is a flow chart showing a flow of process of the idling stop device 1 regarding the reset of the microcomputer.

First, it is determined whether or not a condition for resetting the microcomputer 2 is established. Specifically, the decreased voltage detecting part 13 determines whether or not the power voltage VCC of the microcomputer 2 is lower than the minimal operation voltage Vt of the microcomputer 2

(Step S61). At the same time, the runaway detecting part 15 determines whether or not the microcomputer 2 falls into a runaway state (Step S62). If the power voltage VCC is equal to or higher than the minimal operation voltage Vt (No in Step S61) and the microcomputer 2 is not in the runaway state (No in Step S62), the process is ended.

If the power voltage VCC of the microcomputer 2 is lower than the minimal operation voltage Vt (Yes in Step S61), an instruction signal is output from the decreased voltage detecting part 13 to the reset part 14. The instruction signal is also input to the memory 3 and voltage decrease information is stored in the memory 3 in response to the instruction signal (Step S63).

On the other hand, even if the microcomputer 2 is in the runaway state (Yes in Step S62), an instruction signal is output from the decreased voltage detecting part 13 to the reset part 14.

Upon receiving the instruction signal from one of the decreased voltage detecting part 13 and the runaway detecting part 15, the reset part 14 sets the reset signal to "L." The microcomputer 2 is reset in response to the "L" reset signal (Step S64). If the voltage decrease information is stored in the memory 3, the memory 3 can still hold the voltage decrease information even during reset of the microcomputer 2.

Thereafter, the microcomputer 2 is restarted. The restarted microcomputer 2 determines whether or not the voltage decrease information is stored in the memory 3 (Step S65). If the voltage decrease information is not stored in the memory 3 (No in Step S65), it is determined that the microcomputer 2 is reset due to its runaway state, and then the process is ended.

On the other hand, if the voltage decrease information is stored in the memory 3 (Yes in Step S65), it is determined that the microcomputer 2 is reset due to the power voltage VCC being lower than the minimal operation voltage Vt. This may means that the voltage of the battery 51 is lower than its normal voltage due to deterioration of the battery 51. Accordingly, in order to strengthen charging of the battery 51, the microcomputer 2 instructs the alternator 52 to increase its electric power over its normal electric power.

Specifically, the microcomputer 2 transmits a signal instructing the alternator 52 to increase the target voltage of the alternator 52 to a voltage (for example, 14V to 15V) higher than a normal reference voltage (for example, 12V to 13V) using the target voltage changing function to the alternator 52 (Step S66). Accordingly, the electric power of the alternator 52 is increased over its normal electric power, thereby strengthening charging of the battery 51. As a result, the voltage of the battery 51 can be increased.

Figure 15:
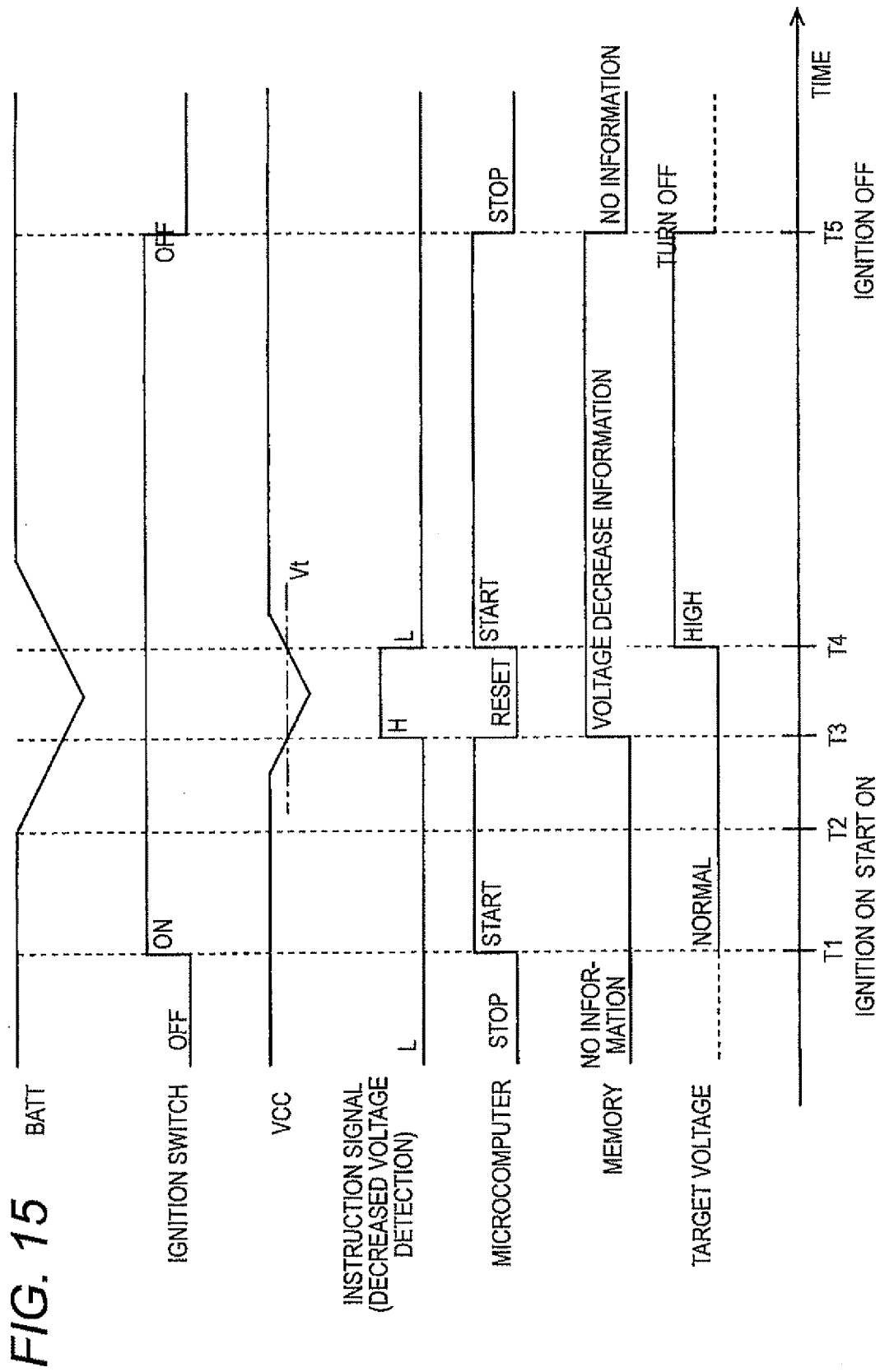
FIG. 15 is a view showing variation of various signals when the voltage of a battery is decreased.

FIG. 15 is a time chart showing variation of various signals in a case where the voltage of the battery 51 is decreased when the engine 57 is started. At the starting point in this chart, the ignition switch 92 is switched off and the engine 57 is not started.

First, at a point T1, a user switches the ignition switch 92 on. Accordingly, power is supplied from the battery 51 to the idling stop device 1 and the microcomputer 2 begins to operate.

Next, at a point T2, the user switches the start switch 93 on, thereby driving the starter motor 55. As the starter motor 55 is driven, the voltage BATT of the battery 51 is decreased. Accordingly, the voltage of the power line 91 is decreased. In addition, if the battery 51 is deteriorated, the power voltage VCC of the microcomputer 2 is accordingly decreased.

In this manner, if the power voltage VCC of the microcomputer 2 is decreased to be lower than the minimal operation voltage Vt of the microcomputer 2 at a point T3, the decreased voltage detecting part 13 detects the power voltage VCC lower than the minimal operation voltage Vt and generates an instruction signal (i.e., sets the instruction signal to "H"). Accordingly, the reset part 14 sets a reset signal to "L" and the microcomputer 2 stops to operate for reset. At the same time, the instruction signal from the decreased voltage detecting part 13 is also input to the memory 3 and the voltage decrease information is stored in the memory 3.

Thereafter, when a load of the starter motor 55 is decreased with rotation of the engine 57, the voltage BATT of the battery 51 is slowly increased. Accordingly, the voltage of the power line 91 and the power voltage VCC of the microcomputer 2 are also increased. If the power voltage CC of the microcomputer 2 is increased to be equal to or higher than the minimal operation voltage Vt of the microcomputer 2 at a point of T4, the decreased voltage detecting part 13 stops the instruction signal (i.e., sets the instruction signal to "L"). Upon receiving this instruction signal, the reset part 14 sets the reset signal to "H," thereby restarting the microcomputer 2.

The restarted microcomputer 2 confirms that the voltage decrease information is stored in the memory 3, and then instructs the alternator 52 to increase its target voltage to a voltage higher than the normal reference voltage using the target voltage changing function. Accordingly, after a point T4, the electric power of the alternator 52 is increased over its normal electric power, thereby strengthening charging of the battery 51.

At a point T5, when the user switches the ignition switch 52 off, the power voltage VCC of the microcomputer 2 becomes 0 to stop the operation of the microcomputer 2. In addition, the voltage decrease information is erased from the memory 3.

As described above, in the idling stop device 1 of fourth embodiment, if the voltage of the battery 51 is decreased such that the power voltage VCC of the microcomputer 2 is lower than the minimal operation voltage Vt of the microcomputer 2, the microcomputer 2 is reset. In the meantime, the voltage decrease information is stored in the memory 3. Accordingly, based on the voltage decrease information, the microcomputer 2 after being reset can detect that the voltage of the battery 51 is decreased, and thereafter can increase the voltage of the battery 51 by increasing the electric power of the alternator 52, which charges the battery 51, to strengthen charging of the battery 51.

[Fifth Embodiment]

Next, a fifth embodiment will be described. The idling stop device 1 of the fifth embodiment has similar configuration and process as that of the fourth embodiment except that the microcomputer 2 of the fifth embodiment further includes a function of invalidating the idling stop function.

In the fourth embodiment, if the voltage of the battery 51 is decreased, the electric power of the alternator 52 is increased over its normal electric power. Since the alternator 52 generates electric power using kinetic energy of the engine 57, the charging of the battery 51 can be further strengthened if the engine 57 is not stopped for as long as possible. Accordingly, in the fifth embodiment, if the power voltage VCC is lower than the minimal operation voltage Vt and the voltage decrease information is stored in the memory 3, the electric power of the alternator 52 is increased over its normal electric power and the idling stop function is invalidated.

Figure 16:
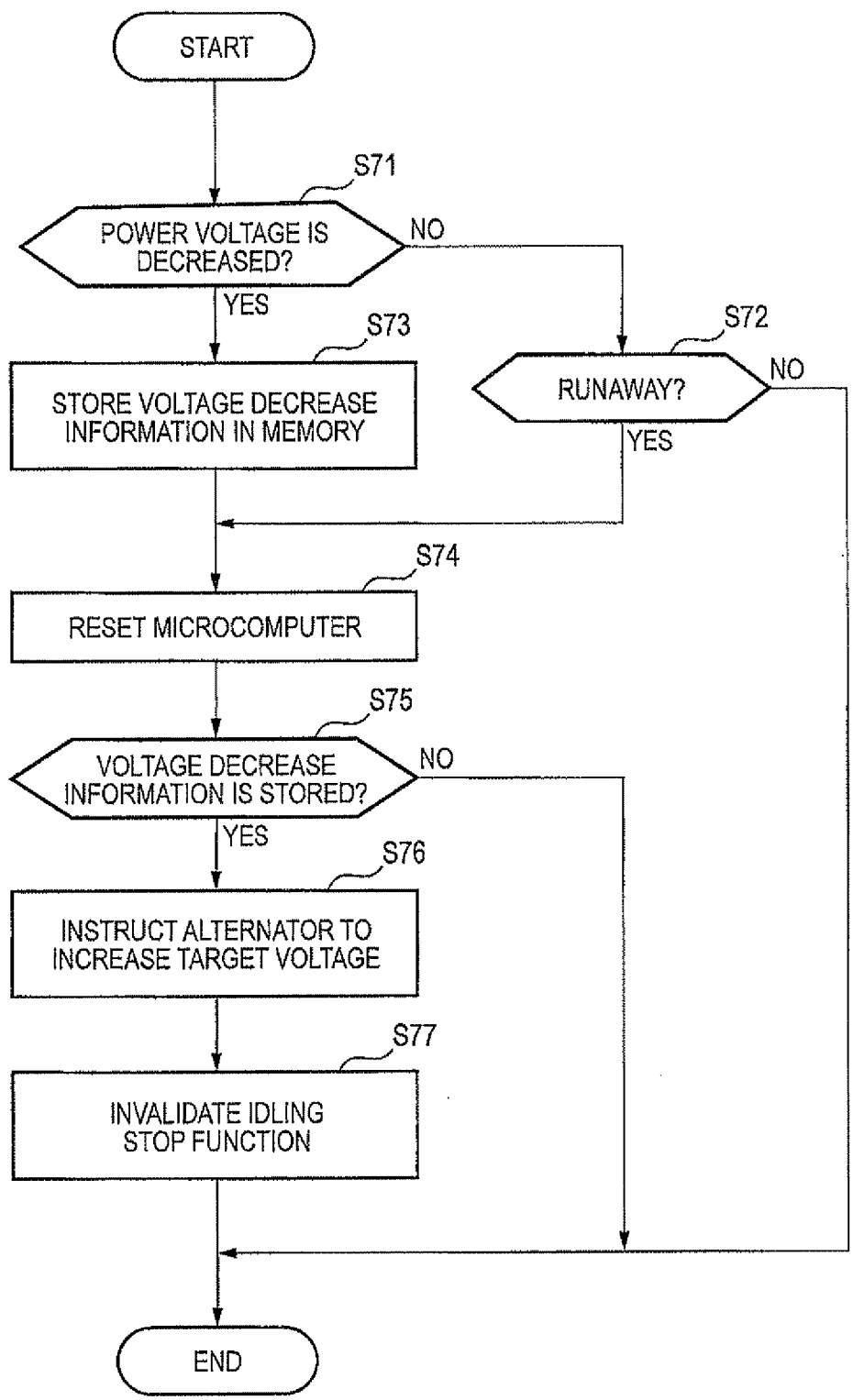
FIG. 16 is a flow chart showing a flow of process of an idling stop device according to a fifth embodiment.

FIG. 16 is a flow chart showing a flow of process of the idling stop device 1, which is related to reset of the microcomputer 2, according to a fifth embodiment. Steps S71 to S76 in this process are the same as Steps S61 to S66 of FIG. 14. Therefore, a difference with FIG. 14 will be hereinafter focused upon.

The microcomputer 2 reset and restarted in Step S74 determines whether or not the voltage decrease information is stored in the memory 3 (Step S75). If the voltage decrease information is stored in the memory 3 (Yes in Step S75), it is determined that the microcomputer 2 is reset due to the power voltage VCC being lower than the minimal operation voltage Vt. Accordingly, in order to strengthen charging of the battery 51, the microcomputer 2 instructs the alternator 52 to increase its electric power (Step S76).

Subsequently, the microcomputer 2 invalidates the idling stop function (Step S77). Accordingly, thereafter, even when a predetermined stop condition is established based on a signal indicating a traveling state, the engine 57 will not automatically be stopped. That is, since the engine 57 is not stopped even in an idling state of the vehicle, the battery 51 can be charged with the electric power of the alternator 52 increased in the idling state. As a result, the voltage of the battery 51 can be effectively increased.

<Modifications>

Although the fourth and fifth embodiments of the present invention have been described heretofore, the present invention is not limited to the fourth and fifth embodiments but various modifications may be made. Hereinafter, such modifications will be described. All features of the present invention, including the features described in the fourth and fifth embodiments and features to be described in the following description, may be appropriately combined.

While it has been illustrated in the fourth and fifth embodiments that the electric power of the alternator 52 is increased over its normal electric power by increasing the target voltage of the alternator 52 over a reference voltage, the electric power of the alternator 52 may be increased over its normal electric power by increasing the rpm of the engine 57 in the idle state (idle rpm) to, for example, 800 rpm over a normal reference rpm (for example, 600 rpm).

In addition, the power voltage of the memory 3 may be directly supplied from the battery 51 or a nonvolatile memory such as an EEPROM or a flash memory may be employed as the memory 3. In this case, the voltage decrease information may be stored in the memory 3 irrespective of switching on/off of the ignition switch. Accordingly, if the microcomputer 2 is only once reset due to a decrease in the voltage of the battery 51, the electric power of the alternator 52 is increased over its normal electric power thereafter. If the battery 51 is replaced with a new one, the voltage decrease information may be erased from the memory 3.

In addition, while it has been illustrated in the fourth embodiment that the memory 3 is configured by the logic circuit to store information of one bit, a memory having a relatively large capacity may be employed as the memory 3. However, as in the fourth embodiment, when the memory 3 is configured by a single logic circuit to store information of one bit, the memory 3 may be implemented at a very low cost.

In addition, while it has been illustrated in the fourth embodiment that various functions are implemented by software by the program-based operation of the CPU, some of these functions may be implemented by electrical hardware circuits. On the contrary, some of functions implemented by hardware circuits may be implemented by software.

What is claimed is:

1. An idling stop device which is mounted on a vehicle and automatically stops and starts an engine of the vehicle, the idling stop device comprising:
    a microcomputer having an idling stop function of automatically stopping the engine when a predetermined stop condition is established and automatically starting the engine when a predetermined start condition is established during the stopping of the engine;
    a detecting unit that is provided separately from the microcomputer, wherein the detecting unit detects a power voltage of the microcomputer, wherein the detecting unit further detects that the power voltage of the microcomputer is lower than a minimal operation voltage of the microcomputer by dropping a voltage of a battery of the vehicle, wherein the minimal operation voltage of the microcomputer is a minimal voltage at which the microcomputer is operable;
    a storage unit that stores voltage decrease information irrespective of a state of the microcomputer if the power voltage of the microcomputer is lower than the minimal operation voltage of the microcomputer; and
    a power control unit that stops supply of power to some of electrical loads to which power is supplied from the battery when the engine is started, if the voltage decrease information is stored in the storage unit.

2. The idling stop device as set forth in claim 1, wherein the power control unit starts the supply of power to the some of electrical loads, to which the supply of power has been stopped, after the engine is completely started.

3. The idling stop device as set forth in claim 1,
    wherein the some of the electrical loads, to which the supply of power has been stopped, are divided into a plurality of groups, and
    wherein the power control unit starts the supply of power to the some of electrical loads for each of the groups with an interval.

4. A power control method of controlling supply of power in a vehicle which is equipped with a microcomputer having an idling stop function of automatically stopping an engine of the vehicle when a predetermined stop condition is established and automatically starting the engine when a predetermined start condition is established during the stopping of the engine, the power control method comprising:
    detecting a power voltage of the microcomputer, wherein further detecting that the power voltage of the microcomputer is lower than a minimal operation voltage of the microcomputer by dropping a voltage of a battery of the vehicle, wherein the minimal operation voltage of the microcomputer is a minimal voltage at which the microcomputer is operable, wherein the detecting the power voltage of the microcomputer is performed by a detecting unit that is provided separately from the microcomputer;
    storing voltage decrease information irrespective of a state of the microcomputer if the power voltage of the microcomputer is lower than the minimal operation voltage of the microcomputer; and
    stopping supply of power to some of electrical loads to which power is supplied from the battery when the engine is started, if the voltage decrease information is stored in the storage unit.

5. An idling stop device which is mounted on a vehicle and automatically stops and starts an engine of the vehicle, the idling stop device comprising:
    a microcomputer having an idling stop function of automatically stopping the engine when a predetermined stop condition is established and automatically starting the engine when a predetermined start condition is established during the stopping of the engine;
    a detecting unit that is provided separately from the microcomputer, wherein the detecting unit detects a power voltage of the microcomputer, wherein the detecting unit further detects that the power voltage of the microcomputer is lower than a minimal operation voltage of the microcomputer, by dropping a voltage of a battery of the vehicle, wherein the minimal operation voltage of the microcomputer is a minimal voltage at which the microcomputer is operable;

a storage unit that stores voltage decrease information irrespective of a state of the microcomputer if the power voltage of the microcomputer is lower than the minimal operation voltage of the microcomputer; and a notification unit that notifies a user of deterioration information indicating deterioration of the battery, if the voltage decrease information is stored in the storage unit.

6. The idling stop device as set forth in claim 5, wherein the notification unit causes an indication unit provided in the vehicle to indicate the deterioration information.

7. The idling stop device as set forth in claim 5, wherein the notification unit includes a storage unit that stored the deterioration information, and a transmission unit that transmits the deterioration information stored in the storage unit to an external device in response to a signal from the external device.

8. A deterioration notification method of notifying a user of deterioration of a battery in a vehicle which is equipped with a microcomputer having an idling stop function of automatically stopping an engine of the vehicle when a predetermined stop condition is established and automatically starting the engine when a predetermined start condition is established during the stopping of the engine, the deterioration notification method comprising:

detecting a power voltage of the microcomputer, wherein further detecting that the power voltage of the microcomputer is lower than a minimal operation voltage of the microcomputer by dropping a voltage of a battery of the vehicle, wherein the minimal operation voltage of the microcomputer is a minimal voltage at which the microcomputer is operable, wherein the detecting is performed by a detecting unit that is provided separately from the microcomputer;

storing voltage decrease information irrespective of a state of the microcomputer if the power voltage of the microcomputer is lower than the minimal operation voltage of the microcomputer; and notifying a user of deterioration information indicating deterioration of the battery, if the voltage decrease information is stored in the storage unit.

9. An idling stop device which is mounted on a vehicle and automatically stops and starts an engine of the vehicle, the idling stop device comprising:

a microcomputer having an idling stop function of automatically stopping the engine when a predetermined stop condition is established and automatically starting the engine when a predetermined start condition is established during the stopping of the engine;

a detecting unit that is provided separately from the microcomputer, wherein the detecting unit detects a power voltage of the microcomputer, wherein the detecting unit further detects that the power voltage of the microcomputer is lower than a minimal operation voltage of the microcomputer by dropping a voltage of a battery of the vehicle, wherein the minimal operation voltage of the microcomputer is a minimal voltage at which the microcomputer is operable;

a storage unit that stores voltage decrease information irrespective of a state of the microcomputer if the power voltage of the microcomputer is lower than the minimal operation voltage of the microcomputer; and an instruction unit that instructs an alternator of the vehicle to increase electric power to charge the battery, if the voltage decrease information is stored in the storage unit.

10. The idling stop device as set forth in claim 9, wherein the microcomputer invalidates the idling stop function, if the voltage decrease information is stored in the storage unit.

11. A battery charging method of charging a battery in a vehicle which is equipped with a microcomputer having an idling stop function of automatically stopping an engine of the vehicle when a predetermined stop condition is established and automatically starting the engine when a predetermined start condition is established during the stopping of the engine, the battery charging method comprising:

detecting a power voltage of the microcomputer, wherein further detecting that a power voltage of the microcomputer is lower than a minimal operation voltage of the microcomputer by dropping a voltage of a battery of the vehicle, wherein the minimal operation voltage of the microcomputer which is a minimal voltage at which the microcomputer is operable, wherein the detecting is performed by a detecting unit that is provided separately from the microcomputer;

storing voltage decrease information irrespective of a state of the microcomputer if the power voltage of the microcomputer is lower than the minimal operation voltage of the microcomputer; and instructing an alternator of the vehicle to increase electric power to charge the battery, if the voltage decrease information is stored in the storage unit.

* * * * *